(12) United States Patent
Agrawal et al.

(10) Patent No.: US 6,795,226 B2
(45) Date of Patent: Sep. 21, 2004

(54) CHROMOGENIC GLAZING

(75) Inventors: Anoop Agrawal, Tucson, AZ (US); Stephan Hansen, Tucson, AZ (US); Juan Carlos Lopez Tonazzi, Tucson, AZ (US); Raymond Zhang, Tucson, AZ (US)

(73) Assignees: Schott Corporation, Elmsford, NY (US); Donnelly Corporation, Holland, MI (US)

( * ) Notice: Subject to any disclaimer, the term of this patent is extended or adjusted under 35 U.S.C. 154(b) by 0 days.

(21) Appl. No.: 10/258,519

(22) PCT Filed: May 4, 2001

(86) PCT No.: PCT/US01/14360

§ 371 (c)(1), (2), (4) Date: Oct. 25, 2002

(87) PCT Pub. No.: WO01/84230

PCT Pub. Date: Nov. 8, 2001

(65) Prior Publication Data

US 2003/0227663 A1 Dec. 11, 2003

Related U.S. Application Data

(63) Continuation-in-part of application No. 09/565,999, filed on May 4, 2000, now Pat. No. 6,373,618.
(60) Provisional application No. 60/285,730, filed on Apr. 23, 2001.

(51) Int. Cl.[7] ............. G02F 1/15; G02F 1/153; B05D 5/12
(52) U.S. Cl. ........ 359/265; 359/275; 359/254; 427/125
(58) Field of Search ................ 359/265, 275, 359/254, 241; 427/125

(56) References Cited

U.S. PATENT DOCUMENTS

| | | | |
|---|---|---|---|
| 5,036,025 A | 7/1991 | Lin | 501/48 |
| 5,073,011 A | 12/1991 | Ito et al. | 359/265 |
| 5,190,896 A | 3/1993 | Pucilowski et al. | 501/64 |
| 5,215,684 A | 6/1993 | Okabayashi et al. | 252/582 |

(List continued on next page.)

FOREIGN PATENT DOCUMENTS

| | | |
|---|---|---|
| DE | 100 06 199 | 8/2001 |
| JP | 10140046 | 5/1998 |
| JP | 10277403 | 10/1998 |
| JP | 11228865 | 8/1999 |
| WO | WO 97/05791 | 2/1997 |
| WO | WO 98/08137 | 2/1998 |
| WO | WO 99/08153 | 2/1999 |
| WO | WO 99/09112 | 2/1999 |
| WO | WO 00/10770 | 3/2000 |

*Primary Examiner*—Georgia Epps
*Assistant Examiner*—M. Hasan
(74) *Attorney, Agent, or Firm*—Fitzpatrick, Cella, Harper & Scinto

(57) ABSTRACT

A transparent chromogenic assembly in which color changes are selectively effectable over predefined areas comprises a pair of facing transparent substrates (15, 21, 28) each covered with a conductive layer divided into individual energizeable areas each provided with a set of busbars (187, 188). A passive layer may be superimposed over one of the substrates, its color being chosen so that the color and the transmissivity of the passive layer accommodates the range of color change and transmissivity of the electrochromic layer to maintain the transmitted color of the panel in a warm or neutral shade. Various other chromogenic windows, devices and systems are also disclosed.

74 Claims, 7 Drawing Sheets

U.S. PATENT DOCUMENTS

| | | | |
|---|---|---|---|
| 5,223,976 A | 6/1993 | Fujie et al. | 359/507 |
| 5,234,871 A | 8/1993 | Krashkevich | 501/73 |
| 5,424,898 A | 6/1995 | Larson et al. | 361/101 |
| 5,780,160 A | 7/1998 | Allemand et al. | 428/426 |
| 5,847,858 A | 12/1998 | Krings et al. | 359/265 |
| 5,856,211 A | 1/1999 | Tonazzi et al. | 438/69 |
| 5,864,419 A | 1/1999 | Lynam | 359/265 |
| 5,956,170 A | 9/1999 | Miyagaki et al. | 359/275 |
| 5,994,840 A | 11/1999 | Forsdyke et al. | 313/635 |
| 6,039,390 A | 3/2000 | Agrawal et al. | 296/211 |
| 6,219,173 B1 | 4/2001 | Udaka et al. | 359/272 |
| 6,244,714 B1 | 6/2001 | Mertens | 359/512 |
| 6,245,262 B1 | 6/2001 | Varaprasad et al. | 264/1.31 |
| 6,246,505 B1 | 6/2001 | Teowee et al. | 359/241 |
| 6,266,177 B1 | 7/2001 | Allemand et al. | 359/265 |
| 6,317,248 B1 | 11/2001 | Agrawal et al. | 359/265 |
| 6,532,098 B1 * | 3/2003 | Kobayashi et al. | 359/265 |
| 2001/0033912 A1 | 10/2001 | Sommer et al. | 428/138 |
| 2002/0196519 A1 * | 12/2002 | Elkadi et al. | 359/265 |

* cited by examiner

CHROMOGENIC GLAZING

This application is a 35 U.S.C.§371 of International Application No. PCT/US01/14360, filed May 4, 2001, which claims the benefit of U.S. Provisional Patent Application No. 60/285,730, filed Apr. 23, 2001 and which is a continuation-in-part of U.S. patent application Ser. No. 09/565,999 filed May 4, 2000, now U.S. Pat. No. 6,373,618.

BACKGROUND OF THE INVENTION

1. Field of the Invention

This invention relates to glazing and, more particularly, to chromogenic glazing for use in applications, such as automobiles and display filters, where it is desirable to reversibly alter the transmission or tinting of the glass. This invention may also be used for other means of transportation glazing such as trucks, buses, boats, planes, trains, etc. and also in building glazing.

2. Related Background Art

Automobile windshields, movable and fixed side and rear windows, and divider panels between the front and the rear cabin, as well as sunroofs, employ various forms of glazing in a variety of colors and intensities. Typically, when tinted glazing is employed, the windshield and the front side windows are clear for safety reasons. Car glazing may provide for management of both ultra-violet and infra-red solar energy penetration to enhance user comfort while reducing the power requirements for air-conditioning. Besides the need to carefully control tinting so that glass used in adjacent windows does not appear to be mismatched, it is important to consider the effect that glazing color can have on passengers' skin tones. For example, some colors, such as deep violet glazing may make the interior colors appear dull and/or strange and cause the skin tones of passengers to appear unnatural.

To adapt chromogenic glass, i.e., glass that has user-controllable transmissivity (for example see U.S. Pat. No. 6,039,390, which is incorporated by reference herein, for various technologies for user-controlled glass transmission, all of which are applicable here) for use in automobiles, it is important that the glass exhibit several characteristics:

1. Chromogenic glazing should be compatible with the color of the car's interior.
2. Chromogenic glazing should be available in "warm" tones and in "neutral" tones.
3. Chromogenic glazing should not acquire an unacceptable color when it is changed from clearer to a darker state under user control.
4. Chromogenic glazing should maintain an acceptable color appearance from the outside, e.g., it is preferable that all of the windows should have similar color properties while permitting the depth of coloration of the windows (and of the sunroof) to vary.
5. Chromogenic glazing for use in a windshield may be colored or bleached to a different shade or color as compared to the other windows to maintain safe, non-glaring conditions during driving.
6. Chromogenic glazing should maintain a desired state of color without consuming too much battery power when the vehicle is parked for a long period of time.

Problems With Prior Art Chromogenic Glass

When a formulation for chromogenic glass is adopted, considerable thought is given to selecting and processing the materials in order for the glass to meet a desired transmission range, durability and environmental resilience, i.e., performance over a range of temperature, typically between −40 to 100 C., varying humidity, and solar radiation. Electrochromic (EC) devices used in automobile glazing should not drain the battery even when left parked in the darkened state. In automobile glazing the aesthetics of color choice play an important role. Automobile manufacturers currently prefer glazing colors that are "neutral" or "warm" so that the flesh tones of the driver and passengers and the interior colors will not be cast in an unappealing light. Certain EC materials, such as those that derive their color principally from tungsten oxide, can typically color to a blue tint and maybe undesirable in some circumstances because their color change fails to meet the neutral/warm criteria. To meet the desired characteristics, such EC materials must be modified by doping, so that they will color to a more neutral shade, but in doing so the coloration range may be compromised. Other compromises made in material selection may affect durability because of electrochemical changes in the material. In addition, glazing used in an automobile windshield may need to have different transmissivity and color characteristics as compared to the side or rear windows and sunroof. While some chromogenic devices may be available that change to a more neutral color, they may not conform to the desired transmission range required for the various locations. The chemical modification of such materials to meet these diverse applications is a daunting task.

It is therefore an object of the present invention to accommodate the different "tunability", "transmissivity" and environmental attributes required of glazing destined for diverse applications, without entailing the time and expense required to formulate a new EC material having the desired characteristics.

SUMMARY OF THE INVENTION

The above noted problems of chromogenic glass for use in various glazing applications are solved in accordance with the principles of the present invention by providing a transparent chromogenic assembly in which color changes are selectively effectable over predefined areas of the assembly that comprises a pair of facing glass substrates separated by an electrolyte. A conductive transparent coating is deposed on facing surfaces of the substrates, the conductive coating of at least one of the surfaces being interrupted to define individual areas each of which is provided with a set of busbars, advantageously of silver frit. An electrochromic electrode layer overlies at least one of the conductive layers. An insulating adhesive sealant spaces apart the substrates and insulates the busbar sets from each other and from exposure to the electrolyte and the electrochromic layer, so that each busbar set may be individually energizeable to effect a color change through a respective one of the individual areas. Advantageously, the electrochromic layer may comprise a transition metal oxide or a mixture containing at least one transition metal oxide, preferably tungsten oxide, while a counterelectrode layer on the facing surface may comprise an oxide or mixture of oxides. A preferred mixture has at least three oxides, preferably two of the three oxides are transition metals and one of them is an alkali metal. A portion of each busbar advantageously extends from the facing surface to and over a respective edge of the substrate to form a connector for the terminal electrode that provides exceptional mechanical stability.

Further in accordance with the invention, it is important to select those attributes which allow chromogenic devices to exhibit low leakage currents, e.g., by employing inorganic EC and counterelectrodes that are selected principally from the transition metal oxides, examples being at least consisting in part of tungsten oxide, molybdenum oxide as EC electrodes and consisting in part of vanadium oxide, nickel oxide, manganese oxide, niobium oxide and titanium oxide for counter electrodes, and by using sulfolane or its derivatives in full or part as the solvent and/or plasticizer in the electrolyte when a solid polymer matrix electrolyte is used. Further, the water content of the electrolyte is preferably lower than 2000 ppm, more preferably lower than 100 ppm and most preferably as low as 10 ppm. The EC and the counterelectrodes may be further doped by alkali metal oxides such as Li, Na, Ba, Ca, K, Cs and Rb oxides.

According to another aspect of the invention, in one illustrative embodiment, a transparent chromogenic assembly is provided which comprises an active component layer and a passive component layer in which the active component layer is selected from the group consisting of electrochromic, liquid crystal, user-controllable-photochromic, polymer-dispersed-liquid crystal or suspended particle devices and the passive component layer is selected from the group consisting of substrates or covers for the active layer, the active and the passive layers being chosen so that the color and the transmissivity of the passive layer accommodates the range of color change and transmissivity of the active layer to maintain the transmitted color of the assembly in a warm or neutral shade, where warm colors correspond on the L*C*h color sphere scale to C having an approximate value between 15 and 45, preferably between 18 and 30; h having a value between 20 and 115, preferably between 40 and 100, and L having a value dictated by the desired degree of glass darkness or preferred degree of photopic transmission. A preferred counterelectrode composition consists of Li, Ni and Mn oxides to facilitate obtaining the desired color change as an intrinsic attribute of the EC device.

Yet another embodiment of this invention is directed to a chromogenic device with controlled variation of the area subject to coloration. This device includes a pair of facing transparent substrates defining a cavity enclosing an electrolyte medium. Each of the facing surfaces of the substrates has a conductive transparent coating. In addition, an electrochromic layer is disposed on at least one of the conductive transparent coatings. Significantly, each conductive transparent coating will have at least two bus bars in contact therewith and the two bus bars are positioned in a spaced-apart relationship that defines a portion of the device in which the area of coloration of the device is variably controlled. Of course if the chromogenic device includes two or more portions as in the previously described chromogenic assembly, one or more of those portions may be designed to allow controlled variation of the area of each portion subject to coloration. The chromogenic device will also include a controller that provides a means for controlling the area of coloration by varying a voltage drop across the portion of the device being controlled. The controller will generally include a switch for applying a voltage between a first of said two bus bars contacting a first of the transparent conductive coatings and an opposing first of said two bus bars contacting a second of the transparent conductive coatings. The controller will also preferably include a variable resistor communicating between a second of said two bus bars contacting the first transparent conductive coating and a second of said two bus bars contacting the second transparent conductive coating. In a preferred embodiment, the area of the portion of the device subject to coloration may be controlled by varying the resistance value of the variable resistor.

Another embodiment of this invention is directed to a chromogenic device having both coloration and heating capability. This device is similar in structure to above described device that provides for controlled variation of the area of coloration, but its controller provides a means to selectively apply a voltage to color the device or heat the device. Preferably, the controller of this device includes an electrical circuit that may be selectively controlled (i) to cause coloration of the device by creating a voltage potential between at least one of said bus bars contacting a first of the transparent coatings and at least one of the two bus bars contacting a second of the transparent coatings and (ii) to cause heating of the device by creating a voltage potential between at least the two bus bars contacting at least one of the conductive transparent coatings. Of course, if desirable a controller may be fashioned to provide the ability to heat the device, color the device and provide control of the area of the device subject to coloration.

BRIEF DESCRIPTION OF THE DRAWINGS

The foregoing and other features of the present invention may become more apparent when the ensuing description is read together with the drawing, in which

FIGS. 2A and 2B depict respective isometric views of portions of the facing substrates while

DETAILED DESCRIPTION OF THE INVENTION

Figure 1:
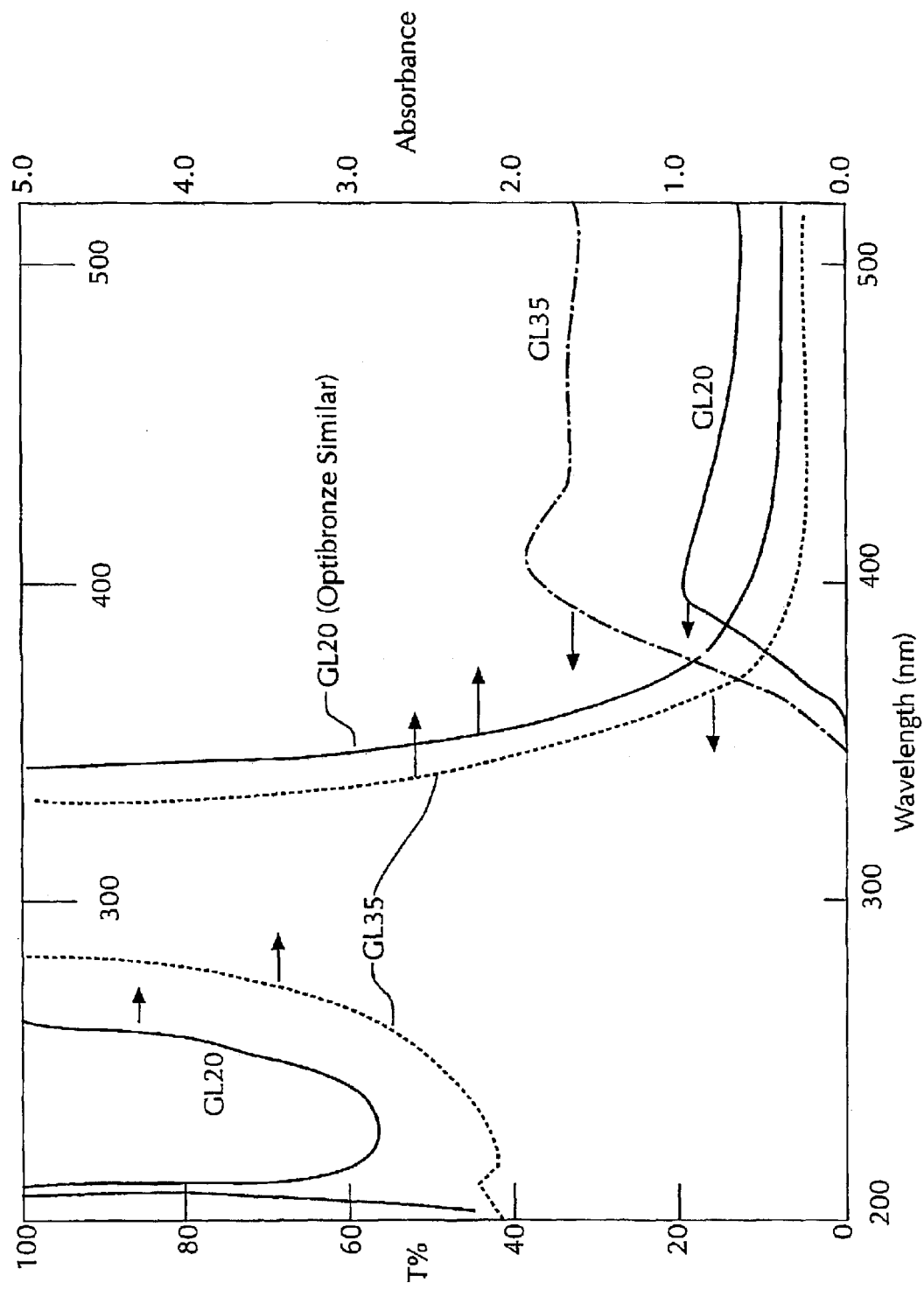
FIG. 1 shows plots of the transmissivity (T) of various glasses over the range of visible wavelengths.

As pointed out in PCT application WO 98/08137 and in WO 99/09112, the disclosures of which are hereby incorporated by reference, chromogenic members may be made by a variety of techniques including electrochromic materials, liquid crystal technology, user-controllable photochromic, polymer dispersed liquid crystal, incorporation of suspended particles, etc.

To achieve the degree of tunability in color and transmissivity desired for automobile glazing, a colored substrate layer may be combined with a layer of EC material or an exterior non-chromogenic cover may be used over the EC material. Typical practical chromogenic devices for this purpose will have a contrast ratio (ratio of bleached to colored transmission) from about 2:1 to about 20:1, preferably about 3:1 to about 20:1. The contrast ratio is typically measured using photopic transmission or total solar transmission. A colored substrate layer added to the EC layer balances the different needs for shading, privacy, clarity, UV and IR blocking that arises in different types of automobiles and at the different glazing locations in the same car. The color of the substrate or of the cover glass should preferably be neutral or should be chosen so as to bring out a "warmth" quality of the color and be synchronous with the car exterior. When a colored glass is used it is preferable to mount the EC so that the colored substrate or cover is facing the exterior of the car so that some or considerable amount of the solar energy is absorbed by the outer glass, firstly to provide UV barrier and secondly to reduce the temperature rise of the EC panel due to energy absorption.

An EC device according to the invention may be made using clear substrates that are laminated (e.g., using poly vinyl butyral, polyvinyl chloride or polyurethane, or another plastic sheet etc.) to a colored glass sheet. Tint and UV blockers may be incorporated in such a plastic sheet. See, U.S. Pat. No. 6,122,093, the disclosure of which is incorporated by reference herein. However, if such a sheet is colored, then a clear glass may also be substituted for the colored glass.

Using an Appropriate Substrate

As described above, one of the substrates, or the cover glass, should preferably bring out warmth in color or be neutral. If the EC device in the bleached state does not have substantial color, any kind of cover glass will impose its own coloration. Thus, if a particular EC device goes from colorless to blue, then a brownish (or warm) cover will allow the device to perceived as being warm in the bleached state and being near neutral in the colored state because brown is a complimentary color to blue.

However, if a 20% transmitting gray colored exterior cover is used, for example, in a sunroof, the sunroof will always be perceived from the outside as being gray during the daytime regardless of the color of the EC panel inside. Thus, the color of the outer glass and its transmittance may solely determine the appearance of the glass from outside for a sunroof during the day. Colors with warmth are described below.

Warm colors on an L*C*h color sphere scale correspond to C between 15 and 45, and h between 100 and 20, while L depends on the darkness of the glass or preferred degree of photopic transmission. Neutral colors correspond to C less than 15, preferably less than 5, and h between 0 and 360, while L can be any number within the desired photopic transmission as given below. The color can also be expressed on other scales, such as CIE (Y, x, y), or L*a*b, etc. For convenience, the L*C*h scale will be used herein. The "C" and "h" in the L*C*h are related to "a" and "b" in the L*a*b scale by:

$$C = \sqrt{V(a^2 + b^2)} \text{ and } h = \tan^{-1}(b/a).$$

For the darker windows, including the sunroof, it is preferred that the bleach transmission should be in the range of 15 to 70% and more preferably in the range of to 35% photopic transmission (i.e., transmission measured over the range of visible wavelengths), although the solar transmission could be different. This range of transmission provides sufficient privacy during daytime when viewed from outside, provides a clear view from inside and allows entry of sufficient daylight to the interior. In the colored state, the preferred photopic transmission range is below 10% and most preferably below 5%. For windshields and front side windows which, preferably, do not use colored glass, the preferred photopic transmission should be greater than 70% in the bleached state to comply with federal safety specifications for motor vehicles. Further, the haze of such windows should be lower than 5%, preferably lower than 2%, more preferably lower than 1% and most preferably lower than 0.5%. To avoid direct glare from the sun during the day and make driving safer, the photopic transmittance of chromogenic windows in this application in the colored state should be lower than 35%, preferably lower than 20% and more preferably lower than 15%. While there is no generally accepted specification for minimum transmission, it is reasonable to set a photopic transmission level that is analogous to that of sunglasses where a photopic transmission in the range of 5 to 20% is usually employed.

A substrate for chromogenic glass can be made in different ways to have the preferred color and can be tempered and coated with transparent conductors, such as indium tin oxide by sputtering or by chemical vapor deposition of fluorine doped tin oxide on a glass float line such as used in the manufacture of Sungate 500. PCT application WO 98/08137 describes several constructions of chromogenic devices using various substrates and the use of an outer glass is used to mask the inner chromogenic glass.

EC devices can be made from commercially available clear transparent conductors. The outer glass could have the desired warm or neutral color. If the EC device is clear (not colored) in the bleached state, then a warm colored cover will result in a warm color being perceived by the viewer. If the EC colors blue, then a warm color such as brown (which is approximately complimentary to blue) will result in a neutral color being perceived. However, it is not only the color of the filters, which are combined, but also how deep the coloration is. For example, if deep blue is combined with light brown, the composite may still be perceived as blue.

Warm colors are typically bronzes, brown, gray-brown and gray-bronze. Glass in these colors are made by several manufacturers. As an example PPG (Pittsburgh, Pa.) has several glasses both coated and batch, some of these along with their transmittance specifications are: Solarbronze tinted (52% visible and 46% solar transmittance), Sungate 300 Solarbronze (Visible 44% and 30% solar transmittance), Sungate 300 Solarcool Bronze (18% visible and 19% solar transmittance) and Optibronze (29% visible and 20% solar transmittance in 4 mm thickness). Such glass is made by coating glass or adding additives to glass composition so that it acquires this color, called batch glass. Since the coatings could scratch, preferred glass for automotive application is made by batch processes. Laminating a colored plastic sheet between two glass panels could also make glass with an acceptable color. Examples of neutral colored glasses are GL20 and GL35 from PPG. Their specifications of photopic transmittance are 20% and 35% and their Solar transmittance are 16 and 29% respectively in 4 mm thickness. Their L*C*h* values and photopic transmittance was measured in our laboratory using a Hunter Lab Ultrascan XE instrument (Reston, Va.). According to the lab measurements the L*C*h value of GL-20 were <L*C*h* 47, 0.94, 243> and photopic transmittance was 16%. For GL-35 these numbers were <L*C*h* 66, 1.6, 125, and photopic transmittance of 35%. It is not necessary that all substrates have to be bulk glass, they can be glass laminated with the plastic inner layers (laminating layers such as poly vinyl butyral, polyurethane, polyester, vinyl, etc.). These plastic sheets may be optionally tinted to obtain the desired color as well.

An EC sunroof which uses Optibronze (L*C*h* 59, 23, 73) as the exterior glass cover in combination with an EC device underneath it will have a warm color in the bleached state as long as the interior EC panel does not contribute to the color too strongly. The photopic transmission of the Optibronze sample measured in our laboratory was 27%. The EC device can color to a different color, e.g., to a blue color or a green color. For the blue coloring EC panel, the passenger inside the car will perceive that the sunroof is coloring to a gray (neutral color).

For car glazing, the outer panel, if separate from the interior EC panel, should preferably block the UV. This could be the outer panel of the EC device or be only a cover glass as described above. The outer glass should block the UV and have an absorption edge between 320 and 400 nm. Absorption edge (i.e., wavelength λ) means that as the wavelength of the light is decreased from the visible into the UV, the panel should start absorbing the light increasingly and that its absorbance should reach 2 at this λ.

The desired degree of absorbance characteristic within the EC device can be obtained by appropriate doping of the tungsten oxide preferably with other oxides. Also, the electrolyte may be modified by adding UV absorbers. However, another effective way, without modifying the device, is to block UV external to the EC device. This can be done by using a substrate which is UV blocking and/or a cover which blocks the UV. Absorbance is the logarithmic (to the base 10) ratio of uninhibited intensity of light to the intensity of such a light beam after it passes through the substrate. An absorbance level of 2 indicates that the glass at that wavelength is only allowing 1% of the incident light to pass through. The wavelength, where the absorbance reaches 2 is defined as the absorption edge. For use in automotive glazing, below the absorption edge (λ) the glass should continue to increase in absorbance or maintain this level of absorbance up to 290 nm or lower wavelengths.

Referring now to FIG. 1, the transmissivity and absorbance of several glasses are shown. GL20 glass and Optibronze have an absorption edge at 350 nm, and GL 35 has an absorption edge at 340 nm at a thickness of 4 mm. The absorption edges for both are very sharp, in that that they reach an absorption value of almost 5 at 340 and 330 nm respectively. These glasses also retain absorbances of greater than 5 at least down to 290 nm and Optibronze retains its absorbance of greater than 5 down to at least 200 nm.

When multiple substrates are used, such as separate cover over an EC panel separated by vacuum, air, krypton, argon or other gases, it would be beneficial to further coat the surfaces of the cover and the EC devices with low-e and/or anti-reflective (AR) coatings. Low-e coatings would enhance the energy efficiency of such glazing and the AR coatings would reduce multiple reflections and hence increase optical clarity from the various surfaces in contact with air, vacuum or gases. As an extension of the technology, at least one of the substrates or the cover glass may be made out of a photochromic material to provide extra depth of darkening that would be a useful addition under bright conditions to the darkening effected by the chromogenic device. This method can also be used in non-glazing applications such as eyewear. The preferred colors for such photochromic substrates are browns (warm) and grays (neutral). Exemplary plastic photochromic substrates include those available under the tradename Transitions™ manufactured by Transitions Optical, Inc., Pinellas Park, Fla. and exemplary glass substrates are PhotoGray Extra®, PhotoBrown Extra®, PhotoSun II® manufactured by Corning, Corning, N.Y.

In addition, the EC systems for the front-side windshield and the front automotive windows (called frontal windows) could be different from the others which may include the sunroof, in terms of the EC device type. For example, The EC device configuration could be different so that higher optical transmission through the frontal windows is obtained. The difference in the transmission may be caused by tinting components (glass electrolytes, additional coatings) as described above, or it may be because simply a different layer thickness for EC and other coatings (transparent conductor, counter electrode, etc.) may be employed. Specifically, a device consisting of tungsten oxide (including doped tungsten oxide), and a counter-electrode (such as nickel oxide, doped nickel oxide, vanadium oxide, doped vanadium oxide, iridium oxide, polyaniline) may employ a 200 nm or thinner tungsten oxide and a 100 nm or thinner counter-electrode for the frontal windows, and thicker coatings for the others, such as 400 nm or thicker tungsten oxide and 200 nm or thicker counter-electrode. Similarly, a difference may also exist in the thickness of the transparent conductor as well. The lower layer thickness will result in higher bleach state transmission of the frontal windows, however, it may not have as high a contrast ratio as the other windows. A preferred ratio of layer thickness of at least one of the layers of the EC system between the frontal and the other windows is less than or equal to 0.5. The advantage of using the same materials is that all the windows can be processed using same materials on the same processing line with only changes in parameters which control the thickness. Another advantage may lie in the control system where similar voltages and voltage range could be used to control all glazing. Further, this is also advantageous if one wished to have similar colors and color change for all windows.

Using an Appropriate Substrate Coating

Another way to select the substrate materials is where the color primarily arises due to the coatings beneath the transparent conductive coating. Since, the transparent conductor faces inside the EC device, and most kind of chromogenic devices require two substrates, the colored coatings cannot be scratched during the use. One such substrate is Solar E from LOF (Toledo Ohio).

Using Appropriate Active Materials

One can also obtain the EC devices that color to a warm tone without the use of colored substrates, i.e., by using active materials (electrolyte, EC and counter electrodes) in the electrochromic devices which result in this color. Such embodiments are shown in FIGS. 2A through 4. When the EC devices are made by using two substrates, 10, 20 facing each other with an electrolyte 29 "sandwiched" between them one could use a permanent color in the electrolyte to generate the required color in the bleach state. For those EC devices where a chromogenic coating and/or counterelectrode 19, 28 (see FIG. 2C), is required, one could select materials so that the desired color is achieved. For example it was discovered by experimenting in the laboratory that when the typical blue coloring tungsten oxide was used for chromogenic coating, e.g., 28 on one of the substrates, e.g., 20, and combination of metal oxides was used for the counter electrode, e.g., 19 on substrate 10, the resulting EC device had the warm color. The transparent conductive substrates 15, 21, 28 and the electrolyte 29 used were clear. The composition of the counterelectrode 19 contained manganese oxide and or nickel oxide. Manganese oxide has different colors depending on its oxidation state, e.g., MnO is green, $Mn_2O_3$ is black and $Mn_3O_4$ is purple red. However, hereinafter for convenience, reference will be made to the oxide as "MnO", without mentioning the valence state of manganese. It should be understood that any of the valence states may be employed depending on the color desired. The manganese oxide coatings, when incorporated into the counter electrode of the EC cells (with tungsten oxide being employed in the EC electrode), exhibited the warm color. Preferred oxides as additives to this mixture for the counterelectrode were oxides of Li, Na, K, Ni and Co. Manganese oxide must be present in the counterelectrode so that the Manganese is at least 20 atomic % of all the other metal cations (excluding hydrogen which may be present as water or as OH groups).

Further, the tungsten oxide used as the chromogenic layer 28 in the above devices could itself be doped with oxides of Li, Na, K or other oxides to impart desirable characteristics to the device. For example, patent application Ser. No. 09/443,109, now U.S. Pat. No. 6,266,177 gives several examples of how tungsten oxide could be doped by other oxides to impart UV resistant characteristics. This reference is incorporated herein by reference. When the device colors, the tungsten oxide coating colors blue but the device color changes from light bronze to blue-bronze or gray. However, if the tungsten oxide coating colors neutral (such as for doped tungsten oxide in U.S. Pat. No. 5,847,858, WO 99/08153 and patent application Ser. No. 09/443,109, now U.S. Pat. No. 6,266,177 then more of the bronze or brown color will be retained in the colored state of the device as well. For the above doped neutral coloring tungsten oxides one could additionally use the preferred dopants such as oxides of Cr, Co, Cu and P as described in the aforementioned patent application to give them enhanced UV resistance. Different tungsten oxides can be used and many of them can doped to give different colors such as from blue to neutral gray. Here it should be noted that Cr, Cu and Co, etc described in our patent application Ser. No. 09/443,109, now U.S. Pat. No. 6,266,177 may also be added to these compositions.

Another important aspect for the chromogenic glazing of cars is its ability to maintain a desired state of color without consuming too much battery power. When the vehicles are parked for long periods of time this can lead to severe battery drainage and cause inconvenience to the user. Also, for several types of chromogenic devices, particularly for the EC devices the change in transmission set by the user and the accompanied charge consumed by the device tend to increase with increasing temperature. Our analysis shows that the chromogenic windows in cars parked in direct sunlight may heat up to 65 to 95° C. in hot summers in many parts of the world. Thus the chromogenic glass should typically consume low power and hold their transmission when subjected to these temperatures. Some type of devices using specific liquid crystals and suspended particles may not even have the required contrast at these temperatures, as discussed earlier the minimum photopic contrast (ratio of bleached to colored state) should be 3:1. Thus for a glazing to be useful, it must meet the colored and transmission levels described above and consume low power. For cars and those applications which have large window areas and depend on battery power, the change in photopic transmission at a temperature of 85–105° C. should be less than 10% in fifteen minutes, and preferably less than 2% when the powering voltage is removed. To maintain a constant transmission, the power can be applied continuously or intermittently. Various ways to power chromogenic devices is explained extensively in the patent application Ser. No. 09/347,807, now U.S. Pat. No. 6,317,248.

Alternatively, at this temperature the average leakage current (averaged over time) to maintain a constant transmission should be less than 10 $\mu A$ (micro-amp)/$cm^2$, and more preferably 1 $\mu A/cm^2$, and most preferably less than 0.1 $\mu A/cm^2$. It is not uncommon to see the leakage current over the active electrochromic window areas increase by a factor of ten or more at 85° C. when compared at room temperature (nominally 25° C.). There are several ways to reduce the drain on the battery, such as the use of supplementary power sources (meaning other than the main battery powering the automobile) including Solar cells; Joule-Thompson effect (thermoelectric) based electric generators and auxiliary rechargeable batteries. Also more efficient power circuits such as those using switching power supplies can be used to step down the voltage more efficiently. However the most preferred device would be one in which, intrinsically, low power is consumed by the EC device for a cost effective solution and, advantageously, any of the above may be combined together to achieve low leakage current. Also, sensors and sleep circuitry may be employed to keep the average current consumption within limits. One way is to sense by a photo-sensor when it is nighttime, and if the car is parked then to automatically turn the power off to the chromogenic system when the ignition is turned off, simultaneously or after a pre-set time. Next day, when the sun comes out, the chromogenic windows can again be energized. This sequence can be continued over several days, and then the sleep circuitry (if used) can take over where the power is cut off to the chromogenic system until the user returns and starts the car. Chromogenic panels for automotive and other applications where conservation of battery power is important should not require an average current exceeding 10 $\mu A/cm^2$ of active area over an 8 hour period at 85° C. to maintain a particular state of coloration.

Chromogenic Construction

Chromogenic windows may be installed as separate members and framed together as one large window or a unit. However in doing so, due to individual seals, busbar areas and play between different sections one could loose visual area. For example when framing is used to put together windows for architectural use (skylights, windows, etc) or for transportation (windows in cars, planes, boats, buses and trains, etc.) the width of the frame in which these sections are accommodated can be typically 0.5 to 2 inches wide (referred to as the non-active area). Also for chromogenic devices, particularly for the EC devices, as the section size in each window increases, in typical constructions their kinetics (speed to color and bleach) will decrease. One way to eliminate the slowdown is by the use of internal busbars as discussed in application Ser. No. 09/347,807, now U.S. Pat. No. 6,317,248.

In many situations it is desirable to have sections of chromogenic panels which are independently controllable without incurring the penalty of excessive "dead" (inactive) areas caused by the need to have a frame around each area. FIGS. 2, 3 and 4 show several ways in which it is possible to achieve multiple sections in a monolithic device in which the width of the non-active area is significantly reduced; e.g., a typical range may be 0.01 mm to 10 mm, or preferably between 0.1 to 5 mm. However, the separation between active areas (which is achieved by the interruption or deletion of the transparent conductive coating as, for example, by etching) should preferably be wider than 0.1 microns to provide adequate electrical isolation. As an example in a car sunroof, one may partition a monolith chromogenic device in two so that each of the driver and the passenger can independently control the tint of a respective portion without diminishing the expanse of the sunroof by the need to use individual frames for each portion. In addition, each sunroof section may even be tied to separate air-conditioning system so that, depending on the choice of the passenger and driver, the tint of the panel on top of their bodies will be synchronized with their individual temperature and/or shade preferences.

Another advantage of partitioning without the need for individual frames is that cost is reduced. For example, for a skylight of a building one may produce four separate EC panels say 1 ft×1 ft (30.5 cm×30.5 cm) in size and frame them together to yield a 2 ft×2 ft (61 cm×61 cm) EC panel. These could then be installed in the skylight for example, as described in the WO 98/08137. Alternatively, in accordance with the framing elimination concept of the present invention, one may start with 2 ft×2 ft (61 cm×61 cm) substrate, and divide the conductive area in four equal square parts by etching away the transparent conductive coating preferably to a width of at least 0.1 microns. This alternative construction achieves the performance of separately made or framed panels, but at reduced cost. For example, a skylight of significantly larger size and superior performance can be fabricated using only two substrates and one set of wiring rather then eight or four sets, respectively, where it is not necessary that each of the skylight cells needs to be independently controlled. If, for aesthetic reasons, it were desired to provide a "framed" appearance, any number of cosmetic dividing bars of any desired width could be used over the monolithic construction without incurring the cost penalty necessitated by prior art individual frame construction of the separate EC panels. Internal busbars may be included in the interior of each of the partitioned areas to give faster response.

Figure 2A:
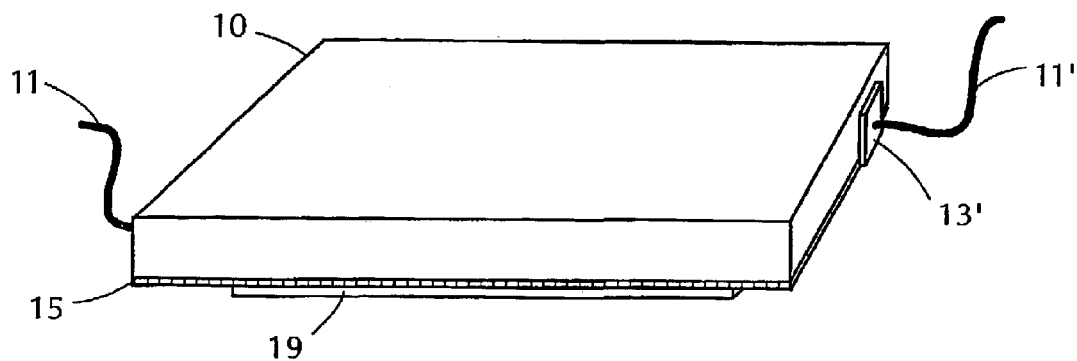
Figure 2B:
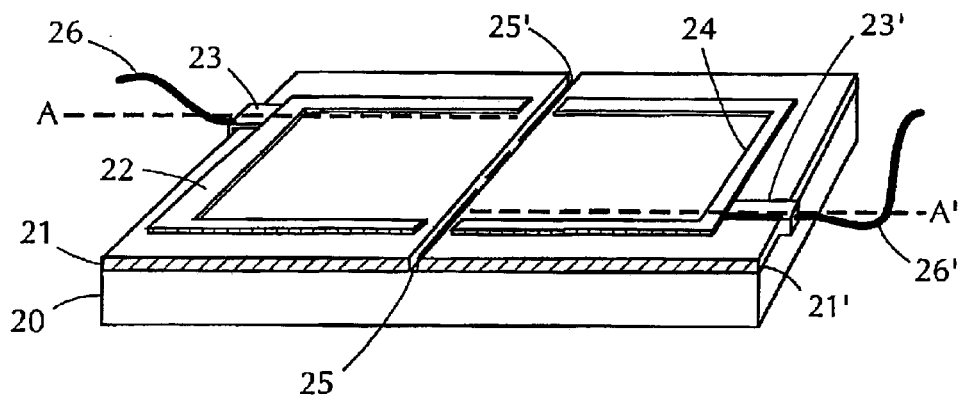
Figure 2C:
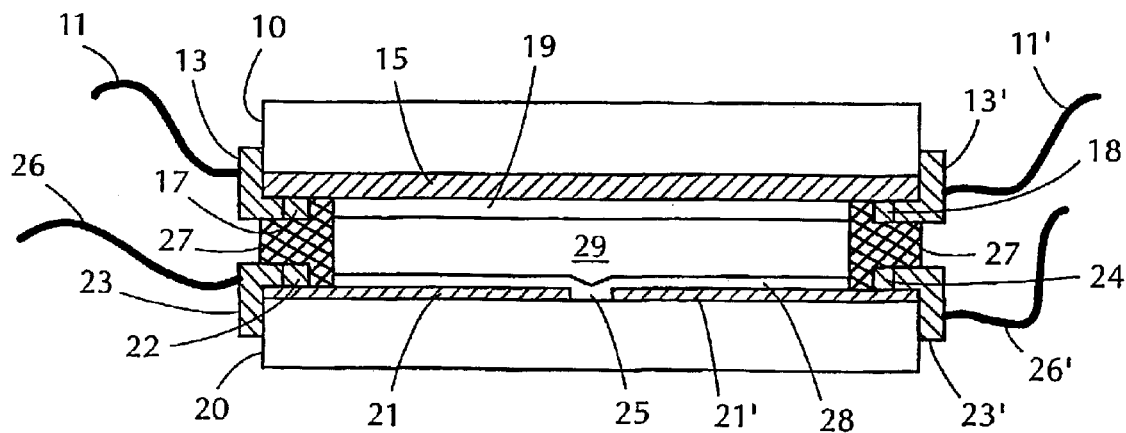
FIG. 2C shows a cross section A—A view through an illustrative EC assembly according to the invention.

FIGS. 2, 3 and 4 show electrochromic devices which utilize an EC and a counterelectrode, however the principals of this construction can be used for any type of EC devices, suspended particle devices, etc. FIGS. 2, 3 and 4 are not drawn to scale. In FIG. 2A, a substrate 10, typically glass, forms the top of an illustrative assembly according to the invention together with a bottom substrate 20 which is shown in FIG. 2B. FIG. 2C is a cross sectional view, A–A', of the composite assembly showing the respective EC or counter electrode layers 28, 19, the insulating spacer/sealant element 27 and an electrolyte 29. Referring to FIG. 2A the upper substrate 10 has deposited thereon a conductive transparent coating 15 (illustratively, tin oxide or Indium tin oxide) which functions as a counter electrode. In addition, a layer 19 may be deposited over the conductive coating 15 and layer 19 may be chosen of materials that exhibit EC behavior if desired.

Figure 3A:
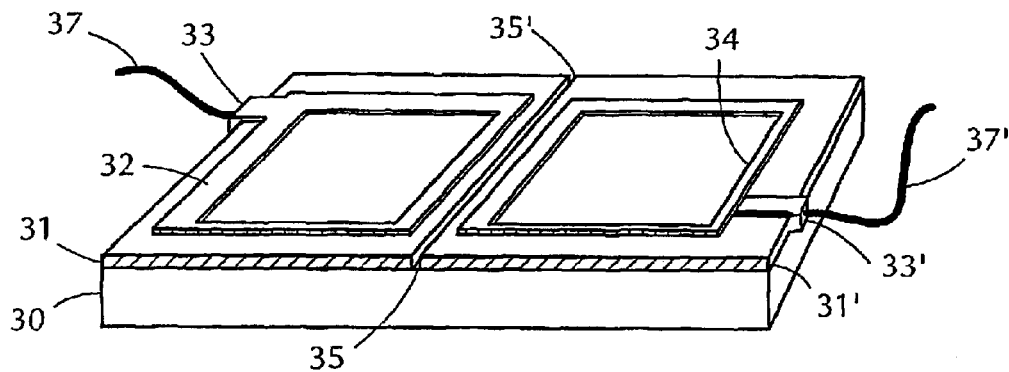
FIG. 3A depicts an isometric view of an alternative embodiment of one substrate.

As more clearly shown in FIGS. 2B, 2C and 3A, the upper and lower substrates are provided with highly conductive busbars, advantageously of silver frit, deposited over the transparent conductive layer, for example by silk screen process. It is preferred that the busbars surround at least 3 sides of the periphery of the transparent conductive layers. Thus, substrate 10 has quasi-peripheral busbars 17, 18 and substrate 20 has quasi-peripheral busbars 22, 24 while substrates 30 and 40 of FIGS. 3 and 4 have busbars 32 and 34 and 47 and 48 that surround all four sides of the associated transparent conductive layer. Use of the busbars provides for more even application of current so that a faster color change will be produced throughout the EC layer when electric currents are applied. Referring to FIGS. 2B and 2C it is preferred that a portion of each busbar 22, 24 extend from the facing surface of the substrate to and over a respective edge to form a respective connector portion 23, 23' to facilitate the attachment of terminal wires 11, 11', illustratively by soldering. To facilitate connections, connectors 23, 23' are advantageously located at edges 23' of the lower substrate 20 that are diagonally opposite to the locations of the connectors 13, 13' of the upper substrate 10. It is important to protect the electrodes from corrosion, particularly in the presence of water by encapsulating or shielding them with non conductive adhesives.

Advantageously a tungsten oxide containing electrochromic layer 28 on the lower substrate 20 may be used together with a LiNiMnO or vanadium oxide (including mixed oxides with vanadium oxide being one of the constituents) counterelectrode layer 19 on the upper substrate 10 to facilitate obtaining the desired color change as an intrinsic attribute of the EC device.

With respect to lower substrate 20, the transparent conductive layer corresponding to the upper transparent conductive layer 15 is split into two segments, 21 and 21' so that the hue and/or density of coloration produced in the left and right hand portions of the assembly may be separately controlled by potentials applied between wires 11 and 26 at the left and between wires 11' and 26' at the right. It is thus an advantage of the illustrative construction that color difference between left and right hand sections may be obtained with minimum "non-active zone" separation between the EC active elements, a separation dictated by the thickness of dividing line 25–25' which separates the transparent conductive layers 21, 21' while the counter electrode layer 19 and the EC layer 28 may be continuous. As mentioned above, layer 19 may also advantageously exhibit EC characteristics if desired.

In FIG. 2C the electrolyte 29 is shown sealed between substrates 10 and 20 by means of peripheral seal/spacer element 27 which is advantageously black in color and which protects and insulates busbars 22 and 24 from electrolyte 29 and from EC/counter electrode layer 19 of the upper substrate 10 and from the electrolyte 29 and the EC layer 28 of the lower substrate 20. Connectors 13 and 13' connect wires 11 and 11' to transparent conductive coating 15 of upper substrate 10 by making contact with bus bars 17 and 18 respectively. Although shown as separate elements in the drawing, it should be understood that connectors 13 and 13' may in practice be formed by extended respective portions of busbars 17 and 18 from the facing surface of substrate 10 to its left- and right-hand edges. Having the connector portions extend to the edges of the substrate yields more surface and greater mechanical stability for effecting the soldering of wires 11, 11' to connect to the conductive transparent layer 15. Similar remarks apply to wires 26 and 26' and connectors 23 and 23' of lower substrate 20.

Figure 3B:
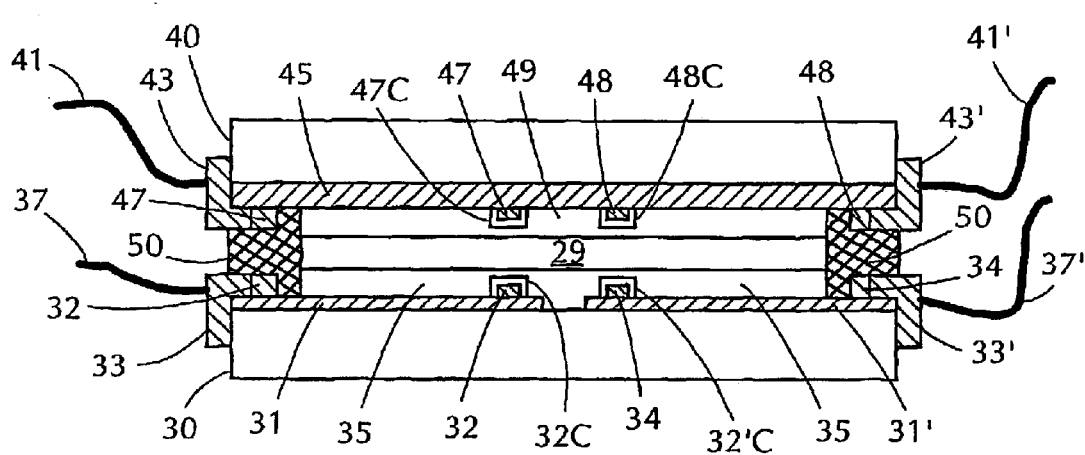
FIG. 3B shows a similar cross section-through the alternative embodiment; employing substrate of FIG. 3A.
Figure 4:
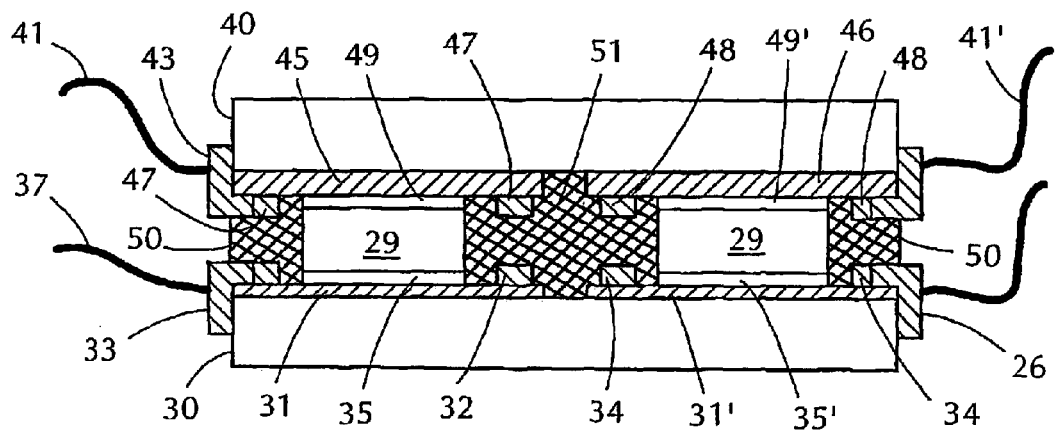
FIG. 4 shows a cross section through a further alternative embodiment.

Referring now to FIG. 3A a substrate embodiment alternative to that of FIG. 2A is shown in which the busbars 32 and 34 substantially completely surround the periphery of the left and right hand colorable sections of the lower substrate. FIG. 3B shows a cross sectional view of an assembly in which busbars 32, 34 of upper substrate 40 and busbars 47, 48 are of the type generally shown in FIG. 3A are employed. To protect those sections of busbars 32, 34 and 47, 48 not otherwise shielded from contact with electrolyte 29, a passivation coating 32C, 34C and 47C, 48C is applied to these portions.

Passivation materials used are those which do not participate in any electrochemical reaction and do not conduct ions. It is further preferred that these are also electronically insulating (unless they are electrochemically inert oxide conductors such as Indium/tin oxide, doped tin oxide, doped zinc oxide and ruthenium oxide). It is also preferred that they have good adhesion to the underlying layers which are principally frits, conductive metal and ceramic lines and the transparent conductors. If solid or liquid electrolytes are used it is preferred that they have good adhesion and wetting respectively. Some examples of these are epoxies, urethanes, silicones and acrylic adhesives and lacquers, which do not contain any conductive fillers. These can be one part or multi-part formulations. They can be thermosets or thermoplastics. They may have adhesion promoting agents such as silanes which are common in the adhesive industry. Further the passivation layer may not be a single layer but multiple layers, e.g., the first layer could be a silane primer or something else to promote adhesion, and the second layer could be one of the materials described above. Other than the class of materials described above these can also be inorganic oxides, or organic-inorgainc hybrids. An example of the first one is silica, alumina, etc, and of the second where such materials are modified by organic moieties. These layers can be deposited by screen-printing, photolithographic processes, dispensing, wet-chemical deposition (e.g., silica using alkoxides such as tetra ethyl ortho silicate, colloids, etc.), sputtering, evaporation, chemical vapor deposition, etc.

In FIG. 4 a similar construction to that shown in FIGS. 3A and 3B is depicted, however, instead of a passivation coating being used on sections of the the busbars that would otherwise be exposed to the electrolyte, a comprehensive peripheral sealant 50, 51 is used. This however has the disadvantage that the separation between colorable sections of the assembly may have to be wider because of the thickness of the sealant along the separation line 35, 35'.

It should be realized that while flat substrates are shown in the drawing for purposes of simplicity, substrates may be curved to accommodate a desired automobile appearance. There are several chromogenic constructions and methods to make such glazing. For example a car sunroof can consist of an outer panel with one or more interior panels. The interior panels can be chromogenic and the exterior of a color which matches with other glazing color. The interior panels could be flat and the outer one can be curved. The transmissivity of each interior panel can be independently controlled, as for example, by the driver and the passenger. However, it is not necessary to have two different chromogenic, e.g., EC panels to provide this functionality. Control over several independent sections of a chromogenic panel can be provided in one monolithic device, as shown in the illustrative embodiment of FIG. 2B. To fabricate a device having two independently controllable EC sections, the transparent conductive coating 17 may be removed from upper substrate 10 and the coating 27 removed from lower substrate 20 by etching along a line 25 as shown in FIGS. 2B and 2C so as to divide the conductive coatings into separate parts on each substrate. The width of the etched line can be from 0.01 mm to several mm. Busbars 21, 22 are then deposited on each of the sections as shown.

Figure 5A:
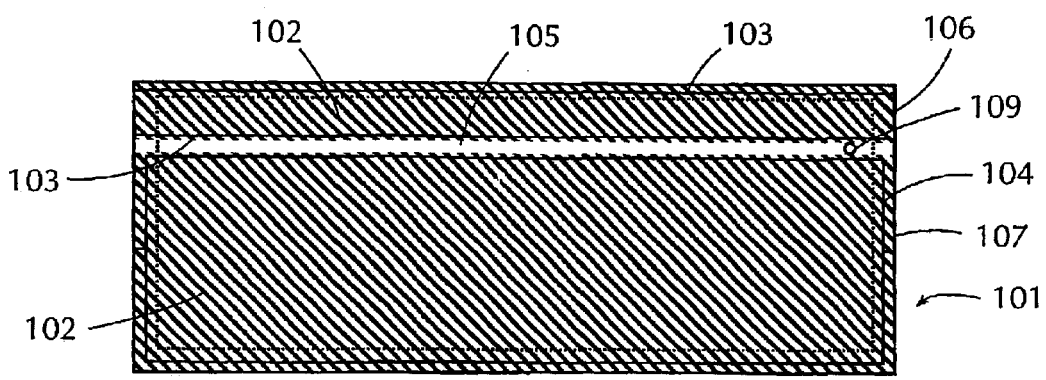
FIG. 5A illustrates an exemplary single substrate with a transparent conductor and busbars that may be used in the chromogenic assembly of this invention.
Figure 5B:
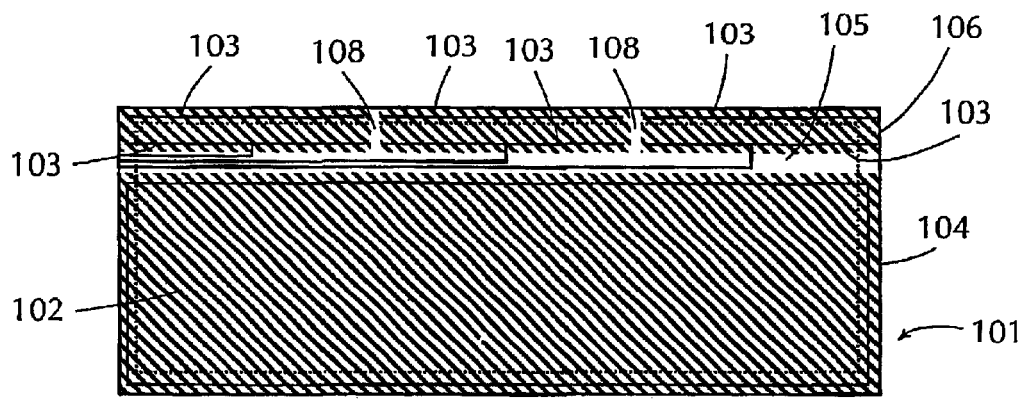
FIG. 5B illustrates yet another exemplary single substrate with a transparent conductor and busbars that may be used in the chromogenic assembly of this invention.

FIG. 5a shows an exemplary application of this concept. For clarity only one substrate 101 is shown with the transparent conductor (shaded areas) 102 and the busbars 103 and 104. For those EC devices where two substrates are used, typically, the second substrate will have a mirror image pattern. In this figure the transparent conductive coating is etched at demarcation line 105 dividing the windshield in two sections, where both of these can be independently controlled. The top part 106 when colored would resemble a shade-band concept. In the bottom part 107 one rectangular busbar 104 is shown which is extended on its two edges so that connections for power can be made. It is not necessary to have two extensions; there can be one or more depending on the windshield size and the voltage (resistive) drop. In the top section 106 two busbars 103 are shown which are extended to one side and connected. Just like the bottom one 104, this busbar could be rectangular and then extended on one side for connection. Since the aspect ratio (length/width) is typically larger than 5, one may not have the side busbars without too much noticeable impact on the device kinetics. There may even be more horizontal sections, each of which could be colored depending on the angle of the Sun (glare source) with respect to the driver's vision. FIG. 5b shows where the shade band or top part 106 is also vertically divided at demarcation lines 108 in three parts. This may be divided in as many parts as needed; a number of three was chosen to demonstrate the concept. The busbars are extended on to the sides in the non-conductive area 105 so they do not interact with one another. Also the top busbars 103 may optionally be extended (not shown) on one side by etching a strip of transparent conductor from the top so that all connections can be made from one side of the glass. For those EC devices which are fabricated using one substrate and in which all other layers including the final transparent conducting layer are sequentially deposited one on top of the other, it may be possible that such divisive patterns are only required on the bottom substrate, or alternatively the top substrate may use tapes or busbars taking care that they do not short through the thin layers underneath. The advantage of this design is that mechanical visors could be eliminated and save cost without adding significant cost during the EC fabrication process. The EC visor concept described above may be extended to any of the other car or other vehicle windows.

These sections can be colored (automatically) or by the user depending on the glare source position. Automatic control can be via a sensor (such as a camera based on a Charge coupled device (CCD) or a Complimentary Metal Oxide (CMOS) sensor) located in the interior of the vehicle, which translates the image into a relative position between the glare source and the driver vision. The camera feedback may also be adjustable by the user (trained by the user) so that it accurately colors the section of the windshield which produces glare, relative to the driver's position. The camera may be mounted or integrated with the rear view mirror, but forward looking through the windshield, in the car header, or on top of instrument panel, etc. For a manual system, the control can be via a push button switch, toggle switch (like an outside mirror position control), or via touching that part of the glass that the user wants to color). Also the user control of the tint for entire windshield (and/or the bottom part of the windshield if it has a shade band as described above) or the other windows can be disabled at night, particularly when the ignition is on or if the car is moving, so that safety is not compromised. The night senor could be a photodiode, photo-resistor, etc., similar to the ones used in the EC mirror, or one could make use of the night sensor in the EC mirror. More on EC mirror sensors and controls can be found in U.S. Pat. No. 5,424,898. Another way to offer glare control is to make use of a positioning system in the car, such as a magneto-restrictive directional sensor (electronic compass) or a global positioning system (GPS). This coupled with or without the above sensors could control the tint of the glazing automatically. Further, controls can be coupled with occupant sensor devices (typically used for safety bag deployment), so that the comfort for other occupants can be maximized automatically. The technology described here allows occupant comfort and extended benefits by selective area tinting which was not possible before. Since EC and other chromogenic technologies allow for gray scale control, the level of the tint can also be varied. Particularly, EC devices can be made which bleach on removal of power, or by shorting the terminals, thus they can also be designed so that a user can manually default the system to a bleached condition in case of malfunction so safety is not compromised. The control system could link the power supply of various windows via wireless means to the central control system. Such wireless means could use standard optical and/or radio frequency technology and/or blue tooth technology. To ensure that in the event of power failure a safety command (such as bleaching of all windows) can be issued, one may back-up such control system and receivers with emergency battery packs, which may be a rechargeable type. In routine maintenance such packs may be replaced if their performance drops. In the parked state the window tint may also be activated remotely by the user by using a different button on the key-fob, or it may be tied to the lock mechanism, so that when the user activates the locks, the windows tint to a darker shade blocking the view from the outside, and this is reversed when the key-fob is used to unlock the car.

The wireless connectivity described above for the chromogenic window system using either one of a user interface or central control system can also be used for architectural and mass transportation systems. When such windows are powered by solar cells which are located in close proximity to each of the windows being powered then the installation or retrofit of such chromogenic windows is possible without any wiring.

Figure 6:
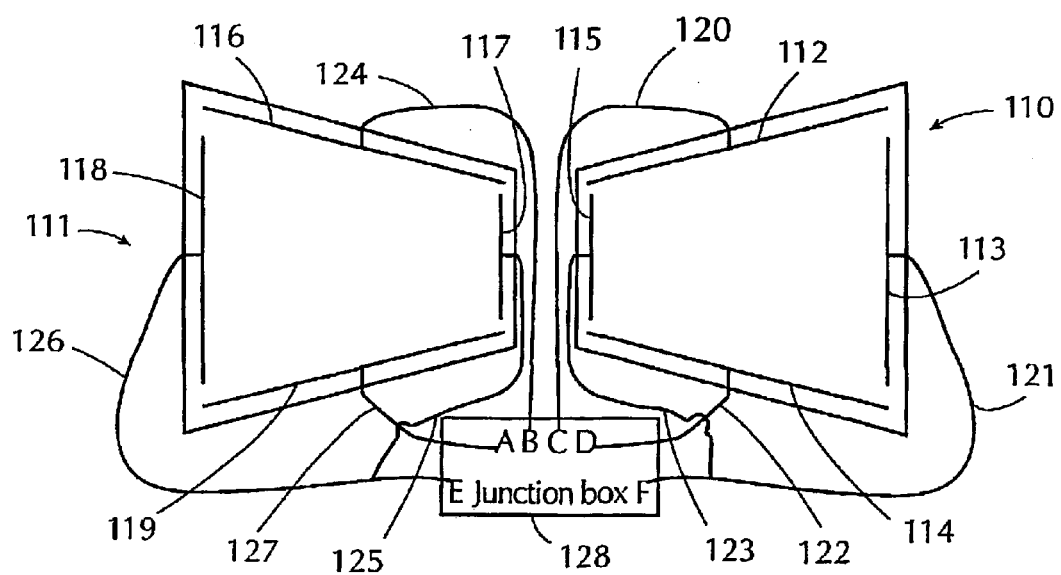
FIG. 6 shows the conductive substrates of a chromogenic assembly that are split apart for illustrative purposes.

FIG. 6 shows another novel concept of this invention where an electrochromic shade band is provided which may be gradually faded towards the bottom. The concept of an electrochromic shade band is mentioned in U.S. patent application Ser. No. 09/347,807, now U.S. Pat. No. 6,317, 248 but that application does not describe an embodiment where power is applied to a set of busbars while the resistance is controlled on another set of busbars which are located on the same device. FIG. 6 only shows the two substrates 100 and 111 with the busbars 112–119. For a complete EC device these will be further coated and then assembled with an electrolyte in between as described, for example, herein. Also, no independently controlled sections are shown in FIG. 6, however, it should be understood they can be accommodated based on the principles discussed above. Also, none of the busbars 112–119 are connected to one another, and all have separate connections 120–127 to a junction box 128. In a normal EC device the preferred way to power the device will be to connect A, B and E together (connections 123; 124, 127 and 126), and then C, D and F together (connections 120, 122, 121 and 123) and then power the device. This will have the same effect as if all the busbars on a substrate are connected. However, if it is desired to have a band that is deeply tinted on the top and gradually fades as it moves towards the bottom of the device, a preferred way will be to only apply the power between B and C (connections 124 and 120, respectively, and busbars 116 and 112, respectively). If the device has a natural current leakage one will observe a strong band at the top that fades towards the bottom. For automobiles it is desired to have devices that have low or no leakage so that power is not consumed when these devices are kept in the colored state for a long time without applying the power. To do this, while EC power is applied between B and C, the connections A and D are connected via an electrical resistor. If this resistor is high (higher than 1 mega-ohm), the device will color slowly and will be quite uniform throughout. If this resistor is low, e.g., less than an ohm, the current leak will be high and very little coloration may be observed at the top. However, by varying the resistor in between, the leakage current, and thus the band shade size can be controlled. A further tuning will be required by EC voltage between B and C to get the appropriate color depth. These connections and the resistance selection can be automatically provided (at the user's command) by the junction box 128 through mechanical and solid state relays and rheostats. The only time a shade band will be required is when the car is running and the user only wants to color the top region, thus in this situation the power leakage will not be a concern. In the parked state either an open circuit or high resistance between A and D will be automatically selected. Thus the user can select whether a shade band is required or uniform coloration is required, in which case all busbars will be connected together as explained above.

Figure 7:
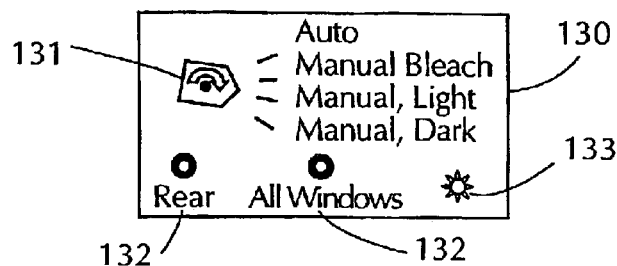
FIG. 7 illustrates a control panel that may be useful in combination with an automotive vehicle having electrochromic glazing.

FIG. 7 shows a control panel 130, which uses a rotary knob 131 and several push-buttons 132 to control the tint of EC glazing. In this example it is assumed that all glazing (windshield, the two front windows, the two rear windows and the back-lite) including a sunroof are electrochromic. In the "Auto" mode, the glare by photosensors or above described systems and/or comfort, e.g., measured by inside cabin or occupant temperature is automatically determined and the tint is controlled accordingly. In the "Manual" mode window tint is selected from bleach, to light tint to dark tint. When the "All windows" push-button is pressed, all windows color according to the knob selection described above. When "Front" is selected then only the front windows color as selected by the knob selection above, but the rear control is through another knob (with similar choices) located in the rear of the vehicle by the occupants seated there. Further, one may configure the panel in FIG. 7 differently, where instead of "Rear" it says "Individual", and then knobs are provided for all the other windows so that an individual sitting next to that window can exercise control. Further, each window may have several sections and may even be heated. Thus it can be seen that there are hundreds of ways in which the control panel and details can be configured, the purpose of this illustration is only to show that a car or any other vehicle which has EC glazing, can be provided with customized window tinting or other functions on demand. Since, for most types of chromogenic glazing transmission change is not instantaneous, a blinking light 133 can be provided as shown on the above panel, which is turned-off or turned on when a steady state is reached, which could be measured optically by the optical sensors described above or the current consumed by the EC system till it reaches a steady state or drops below a certain value, e.g., below 1 mA/sqft of area. This may be coupled or substituted by audible indicators. A safety mode can be incorporated in the system, where in case of an accident, or low battery the windows are automatically shorted. For an accident detection either a separate shock sensor can be used or it can be tied to air-bag deployment sensors. In case of a car entering a tunnel or when the sensors (described above) detect that it is dark, the front windows and the windshield (if electrochromic) would bleach automatically by applying the bleach power protocol.

Figure 8:
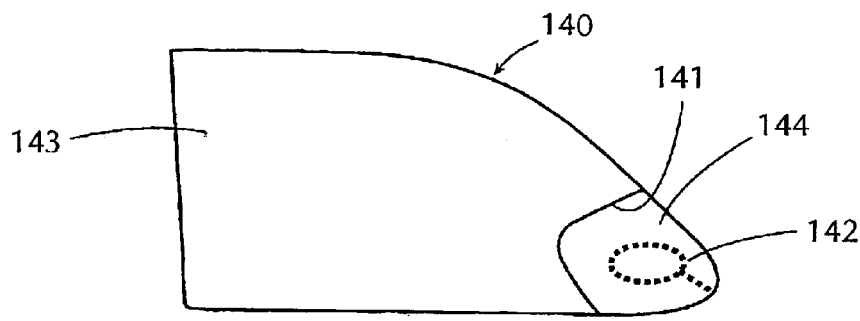
FIG. 8 illustrates an electrochromic front side window of this invention having a separate electronic controllable partition that corresponds to the area through which the side view mirror is observed.

To enhance safety, the rear window may start bleaching when the reverse gear of the vehicle is engaged. If stop lights CHMSL (center high mounted stop light) are mounted inside of a vehicle, one may inactivate the area through which it illuminates. This can be done by removing the EC coating (or not depositing the coating) in this area, or etching a fine line in the transparent conductor which is not connected to powering busbars. Another example of such an application is illustrated in FIG. 8, where a front side window 140 of a car is shown. Since, this window is also used to view the outside mirror, the window is partitioned along demarcation line 141 so that the driver is able to view the mirror 142 even when the rest of the window 143 is tinted. This pattern may be optionally repeated on both sides (left and the right side). The mirror part of the window 144 can be controlled separately from the rest of the window. Since, this is a smaller section of the window this will also color and bleach fast for electrochromic systems. Since, this has a separate control, one could design the electronics in this part so that it does not color too deeply for safety reasons. Again this part can be bleached and not user controllable at night as described above. One may even design the window so that this part is always clear typically more than 70% photopic transmission and its tint cannot be varied.

In another embodiment the look through area for the mirror 144, can work like an EC mirror at night, i.e., this section of the window is darkened rather than the mirror, or both may be darkened to increase the contrast if so desired. This feature can provide the electrochromic mirror functionality without the use of an EC mirror. Since this area in the window is small, only a deletion line in the transparent conductor may be required without the busbars being present in the vision area for any of the sections. This will keep the visible distractions to a minimum as well. The speed of transition of the area through which the mirror is viewed will have to be as fast as an EC mirror, or at least acceptable for the purpose. For those cars where the mirror is replaced by an internal screen or the image is collected and displayed inside in this corner (but inside of the vehicle), one may still use the partitioning described above so as to shade the display from glare, even if the rest of the window is in the bleached state. Either the entire window or only this section may be configured with a heater (as described below) for defrosting.

This and other car windows can also be divided in sections as described above so as to control specific areas for glare while leaving the other areas clear. Examples may be to enhance the contrast if a Heads-up-display is used which is typically located in the windshield area. The partition between the driver and the passenger compartment of a bus, boat, limousine may be divided by an EC panel, which may have separately addressable panels depending on the need. One may even integrate displays as a section of the EC panel. The pixels of these can be individually addressed as described in an earlier example where the shade-band was divided in three parts. The display can be driven using standard interface to display information on fare, approaching towns, sights, time (clock functions), etc. For those windows that open, one could have the EC action (power) be cut-off or bleached when the window is rolled from its completely closed position, or if it is only opened beyond a certain measure. However, for windows that move, it is important to provide a cable management so that the wires do not get entangled, linear springs or rotation devices to ensure that the wires do not have excessive slack, but also give in easily when they need to be extended.

For the glass in the rear of the automobile (or the back-lite), one typically finds the heater bars for defrosting. The position of these can be matched with that of the busbars for the chromogenic device so that the visibility through this is not affected. Further, some of these busbar locations could be partitions so that only selective areas could be colored if so desired. The heating strips could be substituted by wires, which run through the electrolyte. However, care has to be taken that an inert, non-porous coating, which does not react with the electrolyte or any of the components in the cell, and at the same time does not block the thermal transfer to an appreciable extent, passivates these wires. Typically these wires should not be heated above 100° C. preferably above 75° C.

Another novel way to heat electrochromic panels is the use of the transparent conductor as a heater and as the electrical path to power the EC device. Although this general concept is described in U.S. patent application Ser. No. 09/347,807, the disclosure is directed to how the voltages to the two opposing conductors in the EC device are controlled differentially. This is difficult to implement practically, as the voltage inside the cell changes with coloration.

Figure 9:
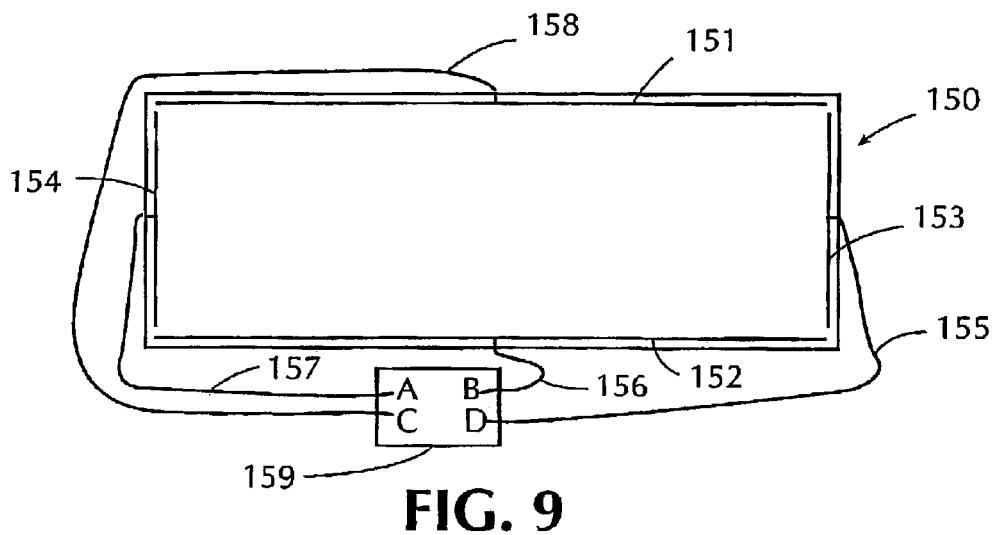
FIG. 9 shows a substrate that may be used in an electrochromic device of this invention and which renders the device capable of heating the substrate.

A practical implementation of this concept is shown in FIG. 9. Again, for the sake of clarity in demonstrating the concept only one substrate 150 is shown and no sections are shown. The busbars 151–154 are shown all around the substrate, but they are not connected with each other (although they may be electrically connected by the underlying transparent conductor) and also, they have independent connections 155–158. All the connectors are routed through a junction box 159 with mechanical or solid state relays. When such a system is used where the EC device function is needed, the connectors 155–158 are all further connected to the EC power source together through this junction box. The second substrate (not shown) or the electrode may have the same pattern of busbars, if a junction box is used, or a continuous busbar with no separate sections. The power is applied to color or bleach the cell, which is device dependent, but typically less than ±3V. However, if one wants to use this device as a heater, the junction box routes the top connection 158 and the bottom connection 156 to two separate terminals where a higher voltage is applied, typically 12 to 42 volts and the max current for a typical rear-lite is less than 5A, preferably lower than 3A. Preferably, the side busbars 153 and 154 are not powered for heating. To use both the EC and the heating mode, one could time proportion between the two functions via the junction box, or one may apply an EC voltage to the second substrate in relation to the first so that the potential difference does not exceed the safe EC potential for that device. This concept is usable not only for backlites but all windows without interrupting the vision. The temperature of the heater should be typically controlled below 100° C., more preferably below 75° C. and most preferably below 50° C. The internal busbars may even function as antennas, or during processing the conductors for antennas are deposited while depositing the busbars for the EC device, preferably of the same materials to save cost.

Figure 10:
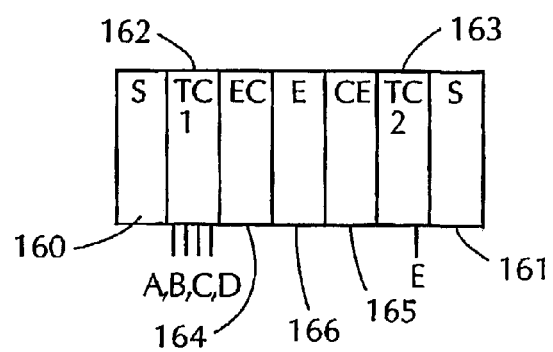
FIG. 10 illustrates a side view of an electrochromic device capable of being used as a heater.
Figure 11:
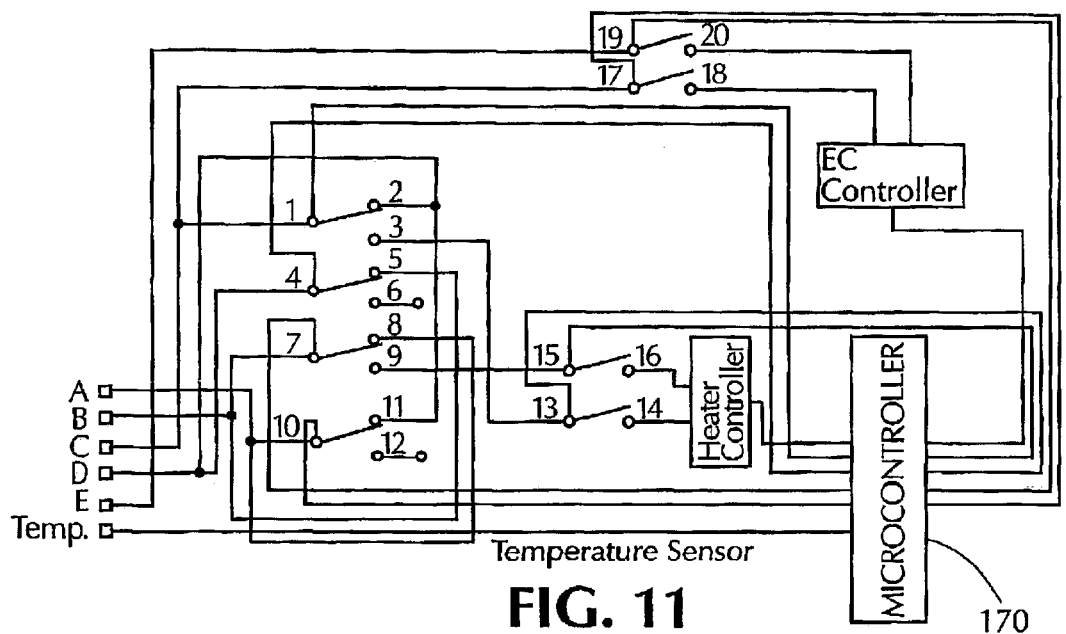
FIG. 11 is an electrical schematic diagram that illustrates a circuit diagram for controlling an electrochromic/heater device.

As an example FIG. 10 shows a side view of an EC device, where A, B, C and D correspond to the four connections labeled similarly in FIG. 9. Connection E is from the other electrode, where only one busbar is used all around. This figure shows the substrates (S) 160 and 161, transparent conductors (TC) 162 and 163, electrochromic layer (EC) 164, counterelectrode layer (CE) 165 and the electrolyte (E) 166. FIG. 11 shows an exemplary circuit diagram to power the EC window in a both heater mode and the EC mode. This shows that a micro-controller 170 controls the switches to the EC power supply, the heater power supply and the switch positions. It also has an optional temperature sensor (thermistor, thermocouple, etc.), which monitors the device temperature. This could be located (and bonded) to the outside of the glass about midway between the top and the bottom busbars. It is preferably located close to the edge so that it can be hidden by the frit or the edge encapsulation. Its output can be corrected for the thermal lag both in terms of time and magnitude. Alternatively, one may not require a temperature sensor or its measurement, if desired the temperature may be estimated as given below. The temperature may be estimated by the electrical resistance when EC color or bleach voltage is applied. The resistance will depend on the temperature, type of device and the area of the device. For EC devices with a counter-electrode configuration described in the examples later, this can be in the vicinity of 100 ohms/ft$^2$. When a high resistance is detected the heating circuit is applied for a duration so that the window becomes reasonably warm (15 to 50° C.) before the EC circuit is applied. The micro-controller ensures that at any given time either the heating or the EC power supply are on and that they are not shorted. Depending on the algorithm it automatically turns one off and the other on. Current consumed by the EC device can be taken as an indication on when to turn the power off to the cell during the coloration and bleach. When the EC power supply is connected to the cell, switches 20 and 18 are closed. In this position switch 20 is connected to E and A, B, C and D are connected to switch 18. Also the switches 1,4,7 and 10 are in contact with 2,5,8,11 respectively so that A, B, C and D are connected. When the heater power supply is providing the heating power, switches 19 and 17 are open, and switches 16 and 14 are closed. Also the switches 1, 4, 7 and 10 are in contact with 3, 6, 9, 12 respectively so that heating power is only applied to B and C. All these are controlled by the microcontroller and the switches are mechanical or solid state relays (SSR). Examples of these and details on EC power supplies can be found in U.S. patent application Ser. No. 09/347,807, the disclosure of which is incorporated by reference herein. Some other substitutes for relays are MOSFETs (metal oxide semiconductor field effect devices), JFETs (Junction field effect devices) and bipolar transistors. These and microcontroller are standard electronic components which people in the art are familiar with.

The chromogenic technology (materials and processing) will change with time. This may cause the new panels to require different powering requirements or their tint may be lighter or darker. Given this it is important to incorporate features if one of the several windows may have to be changed in a system (e.g., a car, a bus, etc.). One way is to equip every window with a memory module such as an EPROM (erasable programmable read only memory), SRAM (Static random access memory), FRAM (Ferroelectric random access memory), Flash RAM or a similar module, which contains the information about the driving requirements of the glass. This module is interrogated by the control system before power is applied. The stored data can be voltage/current/time characteristics, change of these with temperature, temperature limits for operation, aging characteristics and corrective actions, how to access different partitions if any, preferred control and feedback mechanisms, etc. This module can be a part of the harness, which powers the glass or could be even bonded on to the glass. Another way could be to provide an interface between the main controller and the powering leads to the glass, which has this information. The controller may also measure the intrinsic properties of the glass, such as its electrical characteristics (e.g., resistance) and then decide how to power the module. The camera sensor described above, or a photo-sensor may be used to provide the feedback so that the windows are colored to about the same extent. This information may also be built into the memory module described above where charge consumption vs. optical density may also be located.

For automobiles where all windows including the sunroof are chromogenic, it may be difficult to locate wireless receiving devices such as global positioning systems (GPS), cellular equipment, etc. inside the passenger compartment as the transparent conductors in such devices may block or attenuate communication signals. This is particularly applicable for those automobiles where all the body panels are constructed from metals. The chromogenic windows described in FIGS. 5a and 5b can accommodate this need because such signals can pass through those areas in the glass where the transparent conductor is removed. Some of these areas may also be located close to the glass edges which are typically covered by dark frits and paints. Another way to overcome this problem is to have external antennas which are linked with the interior cabin via hard wires, and which may be further linked by hard wires or wirelessly with other interior devices. Another novel way to overcome this problem could be the incorporation of optical devices so that the communication from inside to the outside the passenger compartment (and vice-versa) can take place through the transparent windows. These optical devices 109 would be preferably located in those areas from where the transparent conductor is removed, such as illustrated in FIG. 5a. These areas can also be used to locate other optical sensors. The preferred sensors would communicate in the Infra-red, and more preferably in the wavelength region of 800 to 1800 nm. The optical devices or wave-guides to carry the signal from or to the edge of the glass may be etched or embedded in the glass laminates.

Another problem which may be encountered is where chromogenic glazing is used in large expanses, particularly in buildings and in various transportation, particularly mass transportation. When large facades are made up of chromogenic glazing, and all of them do not darken to the same extent, particularly with aging, then it can give a checker board effect. This may reduce the cosmetic attraction. With aging the efficiency of the chromogenic materials may change, and some of the windows may be replaced by new ones due to breakage, etc. The resulting non-uniformity of appearance could happen to the viewers from the outside or the inside occupants who are in rooms where a number of such panels may make-up a wall or a large area. A way to mitigate such a appearance is to use imaging sensors, such as cameras, and a preferred solution are inexpensive CMOS (complimentary metal oxide semiconductor) cameras. It is further preferred to use digital cameras to provide easier communication and eliminating the need for data conversions from one format to the other.

Figure 14:
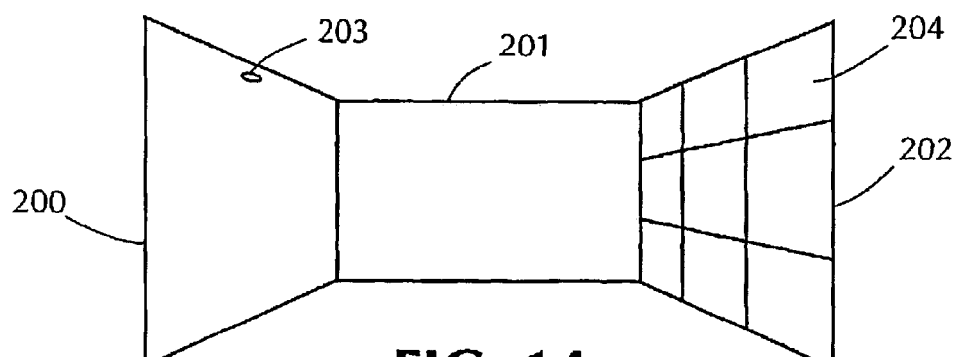
FIG. 14 illustrates a large window with independently powered chromogenic panels tied to an image sensor located on a wall opposing the window.
Figure 15:
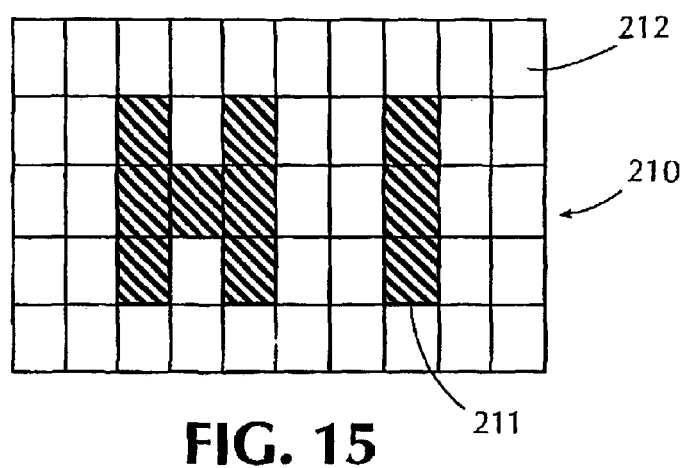
FIG. 15 illustrates a large area window comprised of a plurality of chromogenic panels wherein selected panels have been darkened to result in a desired image.

Use of cameras as an optical sensor is described in U.S. Pat. No. 6,039,390. However, the use of such optical sensors to overcome potential non-uniformity of large area glazings is not described. These cameras can be located on the outside of the building and/or in the inside of the room. This concept is illustrated in FIG. 14 which shows three walls, 200, 201 and 202 of a room. A sensor 203 is located on wall 200 opposite wall 202 which is comprised of a plurality of chromogenic glazings 204. Where such a sensor 203 is located in a room, on, a wall which is facing the chromogenic glass wall/window, the sensor 203 will periodically take the image of the window, and send a signal to the individual sections of the chromogenic panels 204 which are controlled independently of one another to change the powering conditions so that an equalization of the tint can take place. The feedback from the camera can be used to make adjustments till the tint discrepancies amongst the windows are removed. The image processing algorithms can take account of image distortions caused by shadows, which typically would cause the image to be darker in certain areas for the same chromogenic panel, and the shapes may not follow the geometric demarcation of the individual panels. Further, if shadowing glare is being caused by specific panels, then that may be programmed in the system, or indicated by the user so that the tint equalization may be different for one set of panels as compared to the other set of panels. Further, image sensors may be used to distinguish permanent obstructions, versus the changes due to the light intensity caused by the modulation of light by the chromogenic windows. If needed such cameras may be also tied to other functions such as surveillance. The control system may even provide a choice to the building occupants to over-ride the automatic system of equalization, so that they can use their own tint pattern or to control glare on a particular spot in a room, such as on their computer monitors. Another example may be preferentially coloring certain windows 210 of a building to display a sign, such as a corporate logo. An example of this is shown in FIG. 15 which illustrates a window 210 comprised of a plurality of chromogenic panels 212. Each pixel 211 in the logo can be one chromogenic window element which is independently controllable or several of these.

Figure 16:
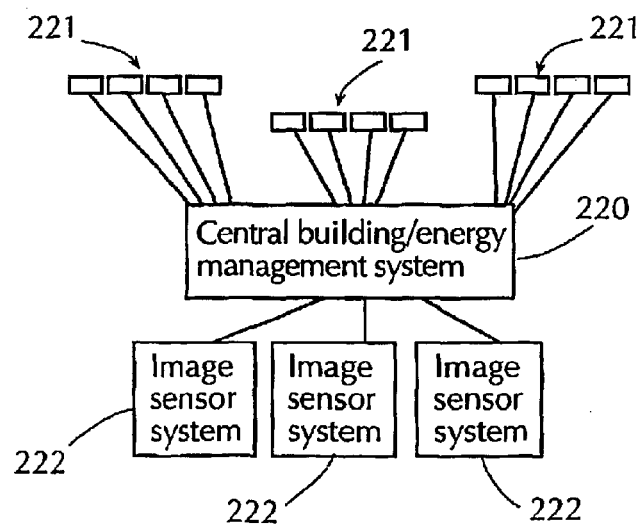
FIG. 16 illustrates a block diagram of a system for controlling three chromogenic windows by individual image sensors that communicate with the individual power supplies/controllers of the windows through a central management system.

FIG. 16 shows a block diagram where a plurality of image sensor systems 222 are tied to a central energy management (including lighting)/building management system 220 and to the individual controllers/power supplies 221 for the chromogenic windows. FIG. 16 illustrates individual power supplies/controller 202 for three chromogenic window facades corresponding to each image sensor 222. These connections can be hard wired or wireless or mixed. FIG. 16 is only an illustration of one possible configuration. In another configuration, the image sensors may be directly linked to the power supply/controllers. The wireless devices may be products using Blue Tooth hardware and protocols. The communication may use internet protocols, as such communication media are generally available in most areas of the building. Some examples of central management systems are TABS™ by Netmedia Inc of Tucson, Ariz., Integrated Building Environmental Communications System (IBECS) from Lawrence Berkeley laboratory (Berkeley, Calif.). There may be external sensors (mounted remote from the building such as another building, a pole in the parking lot, etc.) which are used to control the tint inequality. Also the external and internal image sensors, i.e., more than one image sensor may be used to control a chromogenic facade. An electrochromic window control system is described in WO 00/10770, which could be incorporated in the inventive system described above which uses image sensors.

As mentioned above, the busbars used in the devices of this invention can be silver frits, but conductive tapes or soldered lines may alternatively be used. One substrate is then coated with e.g., tungsten oxide or doped tungsten oxide and the other with a counterelectrode. Examples of counterelectrodes are vanadium oxide doped vanadium oxide mixed with oxides of cerium, titanium, niobium and nickel and manganese oxide based systems described above. The cell is assembled with these two substrates facing inwards with the electrolyte in between. Since, electronically the two sections are not connected together one could only power one section and not the other.

FIGS. 2, 3, and 4 show that a transparent conductive layer 15, 21 or 45, 35 has been etched, preferably on both substrates 10 and 20, respectively. If different chromogenic sections have to be controlled independently to a different transmission or color, then it may be preferred to etch both.

The partitioning mechanisms of FIG. 2C, 3B or 4 may thus advantageously be used to section car sunroofs where each section is independently controllable. Similarly, an electrochromic windshield may be effected that has a sunshade band at the top which could be a different section from the rest, and even have different chromogenic properties, as described above while the remainder of the windshield need not be chromogenic; meaning either that the EC layer or the conductive layer underneath may have be removed or not deposited. Alternatively, one may use a substrate which is only as big as the required visor and which is then fabricated in to a device by laminating onto a larger substrate such as the entire windshield. Another example can be a chromogenic cover for the instrument panel for the car. This instrument panel can have different sections and the transmission of each section could be independently controlled to provide the desired functionality or to maintain the most desirable vision/least glare from a driver's perspective. Since EC technology has variable control, the different sections can be controlled to different depths of transmission. For instrument panels, it is preferred that the EC devices have a photopic range of more than 70% down to less than 20%. Further antireflective coatings (average visible light reflection less than 1%) on these panels will keep the visual interference from reflected light low. The car windows can also be sectioned to maximize the passenger and/or driver comfort.

EC Device Processing

As mentioned, chromogenic panels may be flat or curved, e.g., for a car glazing such as a sunroof. To make a chromogenic device such as an EC device for a sunroof, the preferred methods are disclosed below. This method preferably employs two substrates, but those with one substrate with all thin film construction can use the same method as well. For example, the outer substrate for the sunroof can be a dark glass with a thickness of 2.5 to 6 mm, preferably 2.8 to 4.5 mm, GL20, GL35 or Optibronze™ (all from PPG, Pittsburgh, Pa.) are typically 4 mm thick. The outer glass should be of a thickness capable of being strengthened or tempered. For this to be done by thermal treatment typically requires a thickness of about 2.5 mm or more. However, as the thickness increases the weight increases. The max strength to weight ratio is achieved with a thickness in the range of about 3 to 4 mm. An alternative is to use thinner strengthened sheets that have been strengthened by a chemical process where compressive stresses on the surface are introduced by exchanging the smaller ions with the larger ones. For example, exchanging of Na+ ions with K+ ions. If those glasses are used which consist of lithium ions then they can be replaced with sodium ions. Chemical strengthening, especially for drawn glass also results in preservation of shape, particularly useful for bent glass. Preferred photopic transmission lies in the range of 20 to 80%. The preferred photopic transmission of the outer glass is lower than 50%. This transmission is measured with the conductive coating but without an EC or a counter-electrode coating. Flat sheets of this glass can be patterned with the silver busbar frit. The glass is then bent and tempered (or strengthened) while also curing the silver fit, all in one process, (the bending of the outer piece of glass for the EC device should have the silver frit on the concave side). A dark non-conductive frit may also be applied to the glass along with the silver frit as long as the silver frit is not masked. The silver frit may also be deposited on top of the dark non-conductive frit. A transparent conductive coating such as indium tin oxide (ITO) is deposited on the substrate so that it contacts the silver frit. The ITO processing preferably takes place at or below 400° C. During bending and strengthening, the frit is heat treated to the final state, but the atmosphere (such as oxidizing and/or reducing (either one of these or in a sequence of any one of these followed by the next one)) could also be controlled so that the ITO conductivity increases and its transparency increases by optimizing its stoichiometry (cation to oxygen ratio in the oxide coating) and the crystal grain size. The second substrate could be similarly processed and be tinted or clear. The frit area may only be subjected to localized heating which follows the frit path. The heating source can be a laser, induction heating or a focused IR or visible light lamp. Preferred photopic transmission of the inner glass is greater than 60%. This transmission is measured with the conductive coating but without an EC or a counter-electrode coating. However for this case the frit and conductive coating will be on the convex side of the curvature. One may even deposit ITO before the frit deposition and bending and strengthening operation. Since it is desirable that the curvatures of the two substrates be matched, it is preferred that both of the substrates be bent together as a pair or bent separately using a mold.

The second substrate (inner glass) in the above case could be similar in thickness to the outer glass, but preferably is thinner, in the range of 0.8 to 3 mm to keep the weight low. One may even use the conventional TEC glass (from Pilkington LOF, Toledo, Ohio), TCO glass from AFG (Kingsport, Tenn.) or Sungate 500 from PPG (Pittsburgh, Pa.) which has a fluorine doped tin oxide coating on one side of the glass. This glass can be clear or colored, where the color could be introduced from coatings or layers below the conductive layer (an example being Solar E glass from Pilkington LOF). The color of this glass could be different or have a different coloration depth as compared to the outer glass. Preferred photopic transmission of this glass is in the range of 20 to 90%. If this glass is thin, this may not be amenable for thermal tempering or strengthening to the same extent as the thick glass. However when the outer and the inner glass are laminated together to form the EC device, the composite could still meet all the automotive safety requirements from a crash simulation or an equivalent test (e.g., Society of Automotive Engineer's test Z26.1-1990). To meet the safety regulation one may use both glasses that are thin and unstrengthened, and still pass this test depending on the mechanical properties of the electrolyte film. Another way to meet the test requirements without strengthening the inner panels is by laminating them with plastic laminates such as Spallshield™ and Sentryglass™ by Dupont (Wilmington, Del.). Several Fluorine doped tin oxide coated glasses keep their conductivity even after bending and strengthening operations.

The substrates are then coated, e.g., one side with tungsten oxide and the other side with a counter-electrode and then either laminated with a electrolyte film and edge sealed to prevent ingress of moisture and other atmospheric elements, or made into the EC device by edge sealing to form a cavity and then filling this cavity with the electrolyte (e.g., a method for this is given in U.S. Pat. No. 5,856,211, which is incorporated herein by reference). Further, if the counter-electrode is such which may require a high temperature treatment typically greater than 400° C., one might consider depositing this before the glass is bent and/or thermally strengthened, so that the same heat treatment could be used to heat treat this coating as well. On one of the substrates the conductive coating may be deposited first before the frit was deposited, and on the other substrate, the frit may be deposited first, followed by the transparent conductor.

The principles of these constructions and the way to process devices with bent or flat glass can also be used for those devices where no active EC or other chromogenic coatings are required. These devices use liquid crystals, suspended particles or EC devices which use at least two redox species in the electrolyte. UV protection can be provided by incorporating additives known in the art to the electrolyte, glass substrates and/or coatings which are deposited on them (which may be on surfaces external to the device and even further laminating them with materials which provide the UV barrier). Many of these are explained in the references cited and for example in U.S. Pat. No. 5,864,419 (which is incorporated herein by reference).

The principals of EC device construction are not limited to automotive and other transportation glazing, but any application which will benefit from this invention, including architectural glazing, decorative chromogenic tiles, lamp covers, displays, mirrors, appliances, cabinets, etc.

Composite laminates can be made using chromogenic glass where such elements are laminated with other elements to give added functionalities. For example, the additional elements can have heater patterns/elements, antenna patterns/elements, alarm patterns/elements, bullet proof elements/layers, etc. The heater filaments may be so fine that they are scarcely seen by the naked eye. The alarm elements may activate an alarm when the glass breaks. Examples of such laminates/elements without chromogenic elements are available under the trade name of Swisslamex® from Glastrosch (Butzburg, Switzerland). To make these novel composites, one of the laminating substrate is the chromogenic cell. On the surface of the cell the above described elements are deposited and then laminated with an additional substrate. Alternatively, one may deposit these elements on the additional substrate before laminating them with the chromogenic member. For an alarm, typically a conductive line pattern is deposited which is then incorporated in the laminate. When the glass breaks the electrical continuity is disrupted which is then sensed by a connected circuit. In the case of heater, conductive coatings, wires or conductive frit patterns are deposited which heat up when electric current is passed through them. They may have thermocouples, positive thermal coefficient elements, etc., attached to them to limit the maximum temperature. Similarly, for antennas, conductive patterns or wires are used which are then connected to an appropriate circuitry.

For bullet proofing several glass and/or plastic sheets need to be laminated so that the energy from the bullet is absorbed by breaking the numerous layers and bonds between the interfaces. Thus, novel composites can be made by combining elements described above with chromogenic panels.

Powering of Chromogenic Devices

The power to chromogenic devices, such as a sunroof, can be delivered in several ways. The power supply to the chromogenic panel can be optionally integrated as one unit with the power supply that is used for powering other functions of the sunroof such as sliding and tilting. Further the power supply may even be optionally integrated to provide power to even other car functions e.g., to power the header console or the car interior, including electrochromic mirrors, lights, displays, communication (within internal car functions and external functions such as remote keyless entry or radio and microwaves), and locks. Different functions require different power characteristics (such as voltage, alternating current or direct current), thus they need to be appropriately shielded to reduce interference. Amongst other benefits combining several functions in one power supply will reduce the current drain on the car and cost.

Power supplies for the electrochromic devices are extensively described in patent application Ser. No. 09/347,807, now U.S. Pat. No. 6,317,248. Electrochromic devices which have a intercalatable counterelectrode and an EC electrode (such as tungsten oxide including doped tungsten oxide) separated by an electrolyte layer can be powered as discussed below: the electronics will be capable of powering preferably in a range of +2V to −2V. The applied voltage will be dependent on the amount of coloration required in the EC cell. The cells can be powered by a constant current (preferably, lower than 1 A/sq.ft of EC area, more preferably 0.5 A/sq.ft of EC area) but limited by a max. voltage (within the preferred range of +/−2V). The maximum voltage and the maximum current may depend on the cell temperature (thus an input for cell temperature will be required). The voltage will be lower at higher temperatures.

To keep the power consumption low it is preferred to use switching power supplies to step down all or part of the potential from the battery to the applied potential. One may use the switching power supply to step down the potential to say 3V or 5V, and then use the linear regulation to tune it to the specific potential. Switching power supplies are those that use a DC to AC conversion and then back to DC to conserve power. This conversion is done by capacitive or inductive coupling. This becomes more important if the main battery voltage is higher. Typical output of DC batteries used in transportation range from 42 to 12 volts. Between the input and the output voltages the conversion efficiency of switching power supplies is greater than 50, and most times greater than 70%. Some sources of such power supplies are Maxim Integrated Products, Inc. (Sunnyvale, Calif.), Linear Technology Corporation (Milpitas, Calif.). These high efficiency switching regulators using inductors or capacitors are sold under many generic names, some of these are: high efficiency switching regulator; high efficiency switching regulator; high efficiency switching voltage regulator; high-efficiency pwm step-down converter; high-efficiency pwm step-down controller; micropower 600 khz pwm dc/dc converter; step-down switching regulator; high efficiency, synchronous step-down switching regulators; high-efficiency step-up converter; wide input range, high efficiency, step-down switching regulator; high efficiency in switching regulator using capacitor; switched capacitor voltage converter; switched-capacitor wide input range voltage converter; micropower, regulated 5v charge pump dc/dc converter; high efficiency inductorless step-down dc/dc converter; switched capacitor regulated voltage regulator; 5v regulated charge pump; step-up/step-down switched capacitor dc/dc converter. Some of these from Linear Technology are designated LT1026, LT1054, LTC1144, LTC1503-1.8/ LTC1503-2, LTC1515, LTC1516, TC1550/ LTC1551LLT1070/LT1071, LT1074/LT1076, LT1170/ LT1171/LT1172, LT307/LT1307B, LTC 1929. Some of these from Maxim are designated MAX887H, MAX682/3/ 4MAX738A, MAX758A, MAX1684, MAX1715, and MAX1636. One may even use the commercial battery charger integrated chips as the heart of the power supplies. Although, the output voltage of these will have to be further regulated to be in the desired range. Some examples of these are DS2760 from Dallas Semiconductor (Dallas, Tex.), MAX1645 and MAX1645A from Maxim. These already have built-in switchable power supplies within the integrated chip.

For many chromogenic devices the coloring and bleaching power (voltage-current-time) is temperature dependent. One could measure the temperature of the device by measuring the temperature on the surface or the interior (such as the electrolyte) of the device. However, for most chromogenic devices it may be sufficient to know if the temperature is high or low. For example, high temperature may be designated as being above 40 to 60° C. On automobiles or other vehicles, one could use photosensors (e.g., those placed in electrochromic mirrors or specifically placed sensors for glazing) and an outside or inside the vehicle temperature sensor to determine if the chromogenic environment is hot-or cold. As an example, if the photosensor senses that it is day light and the outside ambient temperature is greater than 35° C. (as measured by an outside the vehicle temperature sensor) then one may use the chromogenic power condition for high temperature. Another example, would be where the photosensor senses it is day light and the interior cabin of the vehicle temperature is greater than 50° C. (as measured by an interior vehicle temperature sensor) one could trigger the higher temperature powering condition. This concept could also be used in buildings. For example, the temperature between the space created by an integrated glass unit (IGU) in which one of the panels is chromogenic could be measured.

Glazing for Boats

The above constructions can be used to make glazing for the boats. This invention is particularly suitable to make glazing for cabins and the bridge (navigation room) of the boats. The boats need to be navigated both during the day and at night. When tinted glazing is used for this, so that the people in the room can be protected from harsh Solar radiation during the day, the same tinted glazing causes poor visibility in the late evenings and night. Thus use of chromogenic glazing in this application will enhance comfort and safety. Further, the reflection of the sun from water may also result in blinding glare. Since the light reflected from the water is polarized, one could use a polarized sheet, which is incorporated within the chromogenic glazing and further enhance the comfort and safety. The use of polarizer in the device which will polarize the light perpendicular to the reflected light will result in blocking the specular reflections from the water. A "sandwich" made of a glass substrate, laminating material, polarizing layer, another laminating layer and a chromogenic element layer, in which the glass substrate faces the outside is desirable. In this construction, both the chromogenic element and the polarizer can be protected by UV radiation from the UV blocking characteristics of the substrates and/or the UV blocking characteristics of the laminating material such as polyvinylbutyral, polyurethane or polyvinylchloride. The laminating materials have UV blocking additives (or stabilizers). Also the other side of the EC element may also be optionally laminated to block UV entering from the other side. The UV blocking characteristics also protect the interior of the boat against aging and fading from the Solar UV radiation. Further, one may provide silver or other busbars on the inside of the glass substrate or the outside surface of the EC element for defogging. Another set of busbars could also be introduced for antenna of radio and microwave signals. One could also coat the outer surface of the glass with hydrophilic coatings for water to spread out or hydrophobic coatings for water to bead-up so that good visibility is maintained even when water droplets hit the surface. One may also coat the outer surface with titania to provide for self cleaning properties and/or hydrophillicity (e.g., see JP11228865A, JP10277403A and JP10140046A). The preferred transmittance range for a boat glass should be greater than 30% photopic, and more preferably greater than 60% photopic in the bleached state. In the colored state the photopic transmission should be less than 25%, and more preferably less than 10%. The preferred colors are again warm and neutral colors. However, the green and blue colors are also acceptable in this industry. The use of colored and or contoured substrates or cover glasses which have the desired colors and design will assist in matching of the exterior appearance.

Display Filters

Display filters, especially those that are to be compatible with night vision systems may profit from the application of the illustrative chromogenic assembly with polarizing materials. For example for military uses one may use static filters in front of displays to block out the near Infrared (NIR). This is done so that in the evening/nighttime when the vehicle or airplane operations personnel use night-vision system, they do not get blinded with the NIR being emitted from the displays. These filters should meet the Military Specifications MIL-L-85762-A. According to this specification various color filters are used for the Night Vision Imaging System (NVIS). These are typically NVIS Green A, Green B, Yellow and Red. This standard requires that the displays not exceed NVIS radiance of $1.7 \times 10^{-10}$ when lightening produces 0.1 fL display luminance. The warning or master caution signals may be brighter, at levels between 50 and $1.5 \times 10^{-7}$ with source luminance levels up to 15 fL for class A Type 1 goggles. NIR for night-vision being defined at least the region between 700 and 1100 nm. Typical glass compositions used for this purpose contain $P_2O_5$ in their compositions in the range, of 30 to 60 mole % and copper (ll) oxide (CuO) in less than 40 mole %. These are described in U.S. Pat. Nos. 5,234,871 and in 5,036,025, which are both incorporated by reference herein. There are other glass forming ingredients in these compositions which are described in the above references. One such phosphate glass is S-8022 (2 mm thick glass) and S-8023 (3 mm thick) glass from Schott Glass technologies Inc. (Duryea, Pa.) which transmits in green. Glasses that transmit white light, yellow and red are for example available from Oxley Avionics (Branford, Conn.) or Kopp filters from Bes Optics Inc (W. Warwick, R.I.). Many of these colors are produced by laminating at least one of the glass substrates which has copper and phosphorous as described above with a substrate which has other desirable spectral characteristics. The purpose of this invention is to provide the night vision capability to the filter and also user controllable optical transmission. This can be done if at least one of the substrates in a chromogenic device has such glass composition. The schematics of construction of various chromogenic devices are shown in PCT 98/08137. Yet another way to provide this functionality is to take a regular glass and coat this by a composition of material, such as the glass described above, and then use these substrates for device building. Coating methods such as physical vapor deposition, wet chemical deposition, etc. may be employed. Wet-chemical route is preferred due to the several components in such coating mixture, thus controlling the homogeneity.

Display glasses can also be made to deliver high contrast, particularly for the full color displays. These glasses are such that only the specific wavelengths at the phosphors emit will be transmitted. These can be further combined with antireflective coatings to give bright displays even in full sunlight. For example phosphor P43 will have emission bands at 544 and 445 nm and Phosphor P22 will emit at 525 and 630 nm. Thus the glass should have high transmission at these specific wavelengths. Typically glasses with multiple absorptions contain rare earth oxides such as neodymium oxide, erbium oxide, ytterbium oxide and mixtures thereof. Typical range of this is between 2 and 20% of the glass composition. As above, glass will also contain other oxide ingredients to impart other properties, such as silica as network former, additives for UV suppression, enhancement of absorption in other wavelengths, viscosity modification, durability enhancement. Examples of these are given in U.S. Pat. No. 5,190,896, which is incorporated herein by reference. As described for the night-vision system chromogenic display filters, which can change their transmission with change in ambient lighting and still maintain high contrast can be made by using at least one of such substrates in their construction. For example a night vision system display filter could be made by combining a said copper containing phosphate based substrate and a said neodymium based substrate in a chromogenic device. An example of a night vision compatible filter that transmits in specific wavelengths for high contrast is made by Wamco (Fountain Valley, Calif.) called NV-2MC. Some of the glass surfaces may have to be coated with a barrier coating such as a SiO2 having a thickness range of 10 to 1000 nm. The transparent conductor is then deposited on the barrier coating. The barrier coating prevents undesirable leaching of cations from the glass and their subsequent transport into the conductive and other layers.

EXAMPLE 1

Fabrication of Electrochromic Devices (Devices 1, 2 and 3) With Tungsten Oxide Electrochromic Layer but Without Intercalating Counterelectrode A 3×3 inch (7.6 cm×7.6 cm) EC window device (Device 1) was made using TEC 15 (from Pilkington LOF, Toledo, Ohio). The tungsten oxide coating, a lithium tungstate $(Li_{0.3}W)O_x$, was deposited on TEC 15 glass. (This is not a reduced form of tungsten oxide as lithium is present as an oxide.) The thickness of the fired coating was 360 nm. The coating was fired in a humid atmosphere followed by a heat treatment up to 250° C. Details of deposition and precursor used can be found in comparative example 1 of PCT 97/05791. The coating was then etched from the perimeter area (about 10 mm in width) of the substrate. A cell was fabricated by dispensing an epoxy around the perimeter of one of the substrates. This epoxy contained 210 micrometer (diameter) spherical glass beads. The epoxy was dispensed on the etched area. The second TEC15 substrate was lowered onto this one while providing an offset of about 5 mm along one of the edges. This substrate had two 1.6 mm diameter holes along its diagonal about 10 mm away from these corners. Care was taken that the epoxy touched the tungsten oxide coated substrate in the etched area. The spacers provided a separation of 210 micrometers between the two substrates, which would be the thickness of the electrolyte. The preferred thickness of the electrolyte is between 37 micrometers to about 5 mm. The epoxy was cured at elevated temperatures (typically in the range of 80 to 200° C.). Typical curing time is between 10 minutes to a few hours. Injecting through one of the holes filled the electrolyte. The electrolyte contained (all weight %) 0.35% ferrocene, 10.5% $LiCF_3SO_3$, 48.9% PC, 32.6% sulfolane and 7.65% of polymethylmethacrylate with a molecular weight of about 540,000. The holes were then sealed with Teflon plugs followed by glass cover slides, which were bonded by a UV curable adhesive. Alternatively, the plug area may be sealed with metallic caps, as described in Example 4. To further enhance the environmental barrier the edges of the cover slide were covered with a thermally cured epoxy.

The same process as described for device 1 was used to make device 2, but the tungsten oxide coating solution also included chromium. The composition of the coating was $(Cr_{0.001}Li_{0.3}W)O_x$. The electrolyte was composed of (all compositions are based on weight %) 0.8% t-butyl-ferrocene, 0.6% $LiCF_3SO_3$, 3.7% Ethyl 2cyano 3'-3 diphenylacrylate (UV stabilizer), 45.4% PC, 31.7% sulfolane and 8.2% of polymethylmethacrylate with a molecular weight of about 540,000.

Another device (Device 3) was made where the coating was $Cr_{0.005}Li_{0.3}W)O_x$. The electrolyte in Device 3 was 1.0% t-butyl-ferrocene, 20% $LiCF_3SO_3$, 1% Ethyl 2cyano 3'-3 diphenylacrylate, 73% PC, and 5% of polymethylmethacrylate with a molecular weight of about 540,000.

The devices were colored by applying 1.2 volts (tungsten oxide electrode was negative) and bleached at −0.3 volts. The L*C*h and photopic transmission values of the three devices is shown in Table 1. Also shown in this table are measured values of Cover Glass GL20, GL-35 and Optibronze respectively. When the above devices are combined with these glass covers (all 4 mm thick) by overlaying them on devices, their composite L*C*h and photopic transmission values are also shown in this table. The table also shows how using different cover glasses can control the color perception of the devices.

| | L* | C* | h | Photopic (% T) | Color Perception* |
|---|---|---|---|---|---|
| Bleached EC devices | | | | | |
| Device 1 | 88.5 | 10.5 | 108.4 | 73.1 | |
| Device 2 | 86.9 | 16.7 | 104.6 | 69.9 | |
| Device 3 | 87.1 | 17.3 | 104.3 | 70.3 | |
| Colored EC devices | | | | | |
| Device 1 | 68.3 | 13.0 | 221.0 | 16.1 | Blue |
| Device 2 | 47.2 | 21.0 | 236.9 | 16.1 | Blue |
| Device 3 | 50.0 | 16.9 | 229.5 | 18.4 | Blue |
| Cover Glasses | | | | | |
| GL-20 | 46.7 | 0.94 | 243.2 | 15.8 | Neutral |
| GL-35 | 65.8 | 1.6 | 125.3 | 35.0 | Neutral |
| Optibronze | 58.9 | 23.2 | 72.8 | 26.9 | Warm |
| Bleached EC devices with GL-20 | | | | | |
| Device 1 | 40.3 | 5.4 | 115.0 | 11.4 | Neutral |
| Device 2 | 39.5 | 8.9 | 109.1 | 10.9 | Neutral |
| Device 3 | 39.5 | 9.1 | 108.8 | 11.0 | Neutral |
| Colored EC devices with GL-20 | | | | | |
| Device 1 | 24.5 | 9.6 | 240.9 | 2.5 | Neutral/Blue |
| Device 2 | 17.4 | 11.9 | 244.9 | 2.4 | Neutral/Blue |
| Device 3 | 19.9 | 8.9 | 233.4 | 3.0 | Neutral/Blue |
| Bleached EC devices with GL-35 | | | | | |
| Device 1 | 57.6 | 8.9 | 110.8 | 25.5 | Neutral |
| Device 2 | 56.5 | 13.2 | 106.7 | 24.4 | Neutral |
| Device 3 | 56.6 | 13.6 | 106.4 | 24.5 | Neurontin ®tral |
| Colored EC devices with GL-35 | | | | | |
| Device 1 | 38.1 | 11.1 | 230.4 | 5.4 | Neutral/Blue |
| Device 2 | 27.8 | 14.4 | 237.1 | 5.4 | Neutral/Blue |
| Device 3 | 30.4 | 11.3 | 226.5 | 6.4 | Neutral/Blue |
| Bleached EC devices with Optibronze | | | | | |
| Device 1 | 51.5 | 26.1 | 79.0 | 19.7 | Warm |
| Device 2 | 50.6 | 29.2 | 80.5 | 18.9 | Warm |
| Device 3 | 50.8 | 29.6 | 80.7 | 19.1 | Warm |
| Colored EC devices with Optibronze | | | | | |
| Device 1 | 31.2 | 6.1 | 125.3 | 3.8 | Neutral |
| Device 2 | 23.2 | 5.9 | 174.5 | 3.9 | Neutral |
| Device 3 | 24.4 | 5.9 | 142.8 | 4.2 | Neutral |

EXAMPLE 2

Fabrication of an Electrochromic Device (Device 4) With Tungsten Oxide Electrochromic Layer and With Vanadium Oxide Intercalating Counterelectrode. These are Small Devices, Thus Prior Deposition of Busbars Such as Silver Frits is Not Required A 3×3 inch (7.6 cm×7.6 cm) EC window device (Device 4) was made using TEC 15 (from Pilkington LOF, Toledo, Ohio). The tungsten oxide coating, lithium tungstate $(Li_{0.3}W)O_x$, was deposited, as described earlier, on TEC 15 glass. This is not a reduced form of tungsten oxide as lithium is present as an oxide. The thickness of the fired coating was 350 nm. Another piece of similar sized TEC 15 was coated with a vanadium oxide coating (counterelectrode). Both the electrodes in the cell store or intercalate ions. Both electrodes posses electrochromic properties, but the doped tungsten oxide imparts stronger coloration. This substrate had two small holes (about ¹⁄₁₆ of an inch (1.6 mm)) about 1.5 cm from two of its diagonal corners. The deposition of the vanadium oxide coating was also done by wet-chemical deposition. Weighing out and mixing the components in the following order made the coating solution: 12 g of isopropyl acetate, 3 g of vanadium triisopropoxide oxide and 1.77 g of 2-ethylhexanoic acid. The mixture was left standing for 10 minutes before using. The coating was deposited by spin coating and then placed in an oven at 80° C. The coating was fired up to 400° C. Preferred firing temperatures are in the range of 300 to 500° C. However, if strengthened glass were used to make these devices, it is preferred that the firing temperatures be kept below 400° C., and more preferably below 350° C. The heating rate from room temperature was 10 C/minute and was kept at the temperature for 2 hours. The coatings were cooled to about 50° C. in the oven by turning it off and leaving overnight and then removed. The coating thickness was 170 nm. This coating was also etched around its perimeter in a width of about 10 mm.

A cell was fabricated by dispensing an epoxy around the perimeter of one of the substrates. This epoxy contained 210 micrometer (diameter) spherical glass beads. The epoxy was dispensed on the etched area. The second substrate was lowered onto this one while providing an offset of about 5 mm along one of the edges. Care was taken that the epoxy touched both the substrates in the etched area. Spacers provided a separation of 210 micrometers between the two substrates to accommodate the electrolyte. The preferred thickness of the electrolyte is between 37 micrometers to about 5 mm. The epoxy was cured at elevated temperatures (typically in the range of 80 to 200° C.). Typical curing time is between 10 minutes to a few hours. On the conductive side of the offset area, a soldered busbar was deposited and connected to an electrical wire. The cell was filled with 1.0 M lithium triflate and 0.05 M Ferrocene in propylene carbonate (PC). All the liquids used to process the cell should have low water content, preferably below 1000 parts per million, and more preferably below 100 parts per million. This was introduced through one of the two holes (fill port) in one of the substrates. The holes were temporarily plugged with plastic inserts. A DC voltage of 1.2V was applied to the cell with the tungsten oxide being negative for about 2 minutes. The cell colored to a deep tint due to the reduction of tungsten oxide by lithium ion insertion. The solution was then flushed out of the cell. It was refilled with ethanol and flushed several times, and then the cell was filled by a solution of 1 molar lithium triflate in PC to clean out any residue. The cell was colored and bleached completely several times (3 to 5 times) by applying −1.2V and +1.2V, with respect to the tungsten oxide. It is important to reverse potential once the cell reached a steady state transmission level. The cell was again flushed several times with ethanol and it was quickly placed under dry conditions, preferably in a glove box which has an inert atmosphere.

The cell is then filled with the electrolyte, which is typically a dissociable salt in a medium. Preferred salts include lithium triflate, lithium methide and lithium trifuoromethanesulfonimide (trade name HQ115 available from 3M specialty Chemicals, St. Paul, Minn.). Preferred solvents are polar solvents such as sulfolane, methyl sulfolane glyme, PC, gamma-butyro-lactone, etc. In this example 1.5M salt in sulfolane was used. The components were dried so that the electrolyte had a water content of less than 30 ppm. Typical salt concentration is chosen from 0.1M to 3M. After this the two holes (fill ports) are sealed. One may use UV curable or thermally curable adhesives. One may also use mechanical plugs followed by adhesives along with cover plates made out of metal, glass or plastic, this is also described in the U.S. Pat. No. 5,856,211 which is disclosed herein by reference. These plates may be used in addition to the mechanical plugs as described above. One may even use plates which may be bonded by ultrasonic means. This method is described in greater detail later. The electrolyte can also contain water and oxygen scavengers; polymeric thickeners (such as polymethylmethacrylate, polyethers such as polyethylene and polypropylene oxides, fluorinated polymers such as polyvinylidene fluoride sold under the trade name of Kynar (Elf Atochem, Philadelphia, Pa.); inorganic viscosity modifiers such as fumed silica and other such inorganic fillers: UV stabilizers, other salts, colorants and dyes, etc. In the final electrolyte one may even add a little of reversible and/or non-reversible redox agents such as metallocenes, preferably ferrocene and its derivatives to restore the charge (e.g., Lithium ions) as the device with an EC electrode and a counter-electrode ages. Typical concentration of the redox agent is lower than 0.05 M, but preferably lower than 0.005 M. The addition of redox agents in electrochromic cells with two ion insertion electrodes is described in U.S. Pat. No. 5,215,684 for EC cells consisting of specific electrodes, electrolytes and salts. This patent is incorporated herein by reference. The aforementioned patent does not, however, describe the addition of these materials in electrochromic cells with ion insertion electrodes of mixed oxides, vanadium oxide containing counter electrodes and in cells containing electrolytes with either sulfolanes, lithium trifuoromethanesulfonimide and mixed salts, low water contents and with UV stabilizers.

As described above, a novel procedure was employed for reducing the electrodes in a cell (or inserting ions in one of the electrodes) where a EC device is made with two opposing electrodes where both function by ion insertion, in this case tungsten oxide and vanadium oxide respectively. In a typical prior art process, one of the electrodes is pre-reduced generally by an electrochemical process. These processes are difficult to control for uniform ion-intercalation, particularly with increasing device size. Further, once reduced, the electrode is vulnerable to re-oxidation in further processing, particularly if it is handled under ambient conditions and more so at elevated temperatures such as seal curing or other steps. Further, this kind of reduction could be expensive as large vats of electrochemical mediums are required to reduce large substrates. In accordance with an aspect of the invention, it is preferred to complete the cell processing as much as possible before such reduction. In this example the cell cavity was fabricated before the reduction process was employed. Further a liquid medium (e.g., propylene carbonate, sulfolane, etc.) containing at least one anodic and/or one cathodic redox material along with a dissociable salt (e.g., lithium perchlorate, lithium triflate, etc.) was injected into the pre-fabricated cavity. One of the cell electrode was reduced by applying a voltage. After reduction the medium was flushed. During the flushing process one may choose to continue to apply the potential as well if there is an evidence of re-oxidation while flushing. The second step described above was cleaning with ethanol. In this step other polar or non-polar solvents may also be used for cleaning, such as acetonitrile, propylene carbonate, hexane, etc., or one may even skip this process by simply introducing pressurized nitrogen and argon to flush the cell clean. The procedure described above is one of many that may be employed and one may even skip the step where the cell is filled with an intermediate electrolyte and cycled a few times prior to the introduction of the final electrolyte. For example, in a simple process, one may simply flush the reducing medium out using inert gases described above and fill the cell with the final electrolyte and seal. The solvent system used in the final electrolyte may be a mixture of sulfolane and its derivatives (e.g., methyl sulfolane). Typically co-solvents to sulfolane are typically added up to 50% of sulfolane. The electrolyte in this case was sulfolane with 1.5 molar lithium trifuoromethanesulfonimide. Examples of other preferred additives or alternatives are co-solvents methyl sulfolane, propylene carbonate, a-butyrolactone, polyethylene glycol, glymes; preferred UV stabilizers are benzophenones and benzotriazoles, e.g., Uvinul 3000, Uvinul 3050 (from BASF, Mount Olive, N.J.) and Tinuvin 213 (Ciba Specialty Chemicals, White Plains, N.Y.); salts such as lithium triflate; and thickener additives such as polyethers (polyethylene oxide/polypropylene oxide copolymer) and nano-particle inorganic oxides such as fumed silica, in situ polymerizable urethane monomers capable of crosslinking (typically an isocyanate terminated monomer, hydroxy terminated monomer and a tin catalyst). The concentration of each of the UV stabilizers and the polymeric and/or monomeric additives is typically less than 20 wt % and preferably less than 10 wt % of the solvents.

The reversible redox promoter in this case was a reversible metallocene, e.g., ferrocene and cobaltocene or their derivatives. In this case tungsten oxide and vanadium oxide are used as the two opposing ion-insertion electrodes with ferrocene as the redox promoter, but one can choose any organic or inorganic which can reversibly intercalate ions. Some prominent electrodes are molybdenum oxide, niobium oxide, Cerium-titanium oxide, Titanium-vanadium oxide, Niobium-vanadium oxide and so forth. A more extensive list of electrodes for EC devices is in patent application Ser. No. 09/443,109.

One may even choose a non-reversible agent in the electrolyte which will reduce the electrodes by being activated by temperature and/or radiation such as UV. Such agents are typically non-reversible. This is explained in U.S. Pat. No. 5,780,160 which is incorporated by reference. One such agent to reduce the electrode is ascorbic acid.

During the fabrication of the device care was taken to use materials in seals and the electrolyte so that electronic conductivity was suppressed. The leakage current in these devices in the fully colored state at 85° C. was difficult to measure with the instruments we used, as it was lower than 0.05 $\mu A/cm^2$. Leakage current means the current required to keep a device in a required state of transmittance. When a EC device is colored to a desired set point, there is power consumed to color the device to this desired transmission and then there is power consumed to keep the device at that level of transmittance. The leakage current is related to the latter. Once the desired state is reached and the power source is removed the device discharges and this is seen as a change in transmission. Thus to keep that level of transmission there are two alternatives. In the first one the power source is not removed so that continuous current is fed in to the device to compensate for the discharge. Alternatively, one can let the device discharge so that its transmission level changes (typically small enough that the user is unable to perceive) and then reapply power to bring it back to the desired state of transmittance. In this case the current is fed intermittently. In either case the feeding of charge is required, this charge is typically drained from the battery, or there is a leakage of charge from the battery. This leakage of charge will eventually drain the battery. Thus to keep the battery drain low in a parked automobile and prolong battery life this leakage (or average leakage current, if intermittent power is supplied) needs to be at a low desired number as given earlier. This leakage current should preferably be measured at the battery. For intermittent powering of the electrochromic device the discharge in the device can be measured e.g., by optical sensors or electronically (such as open circuit potential of the cell). Another way of specifying low leakage current also is to specify change in device transmittance when the power is removed (open circuit).

Once the device was colored, it changed by less than 1% photopic transmission in 15 minutes when stored at 85° C. without any voltage being applied and changed by about another 0.5% in the next 35 minutes. It is preferred to have devices that change less then 5% of their transmission when stored at 85° C. for 15 minutes without any external application of potential (open circuit). In the counterelectrode devices, one of the important variables to get low leakage is to keep the water content lower than 2000 ppm, preferably lower than 100 ppm and most preferably as low as 10 ppm.

| | L* | C* | h | Photopic (% T) | Color perception |
|---|---|---|---|---|---|
| Bleached EC device | | | | | |
| Device 4 | 79.6 | 6.3 | 173.2 | 57.8 | neutral |
| Colored EC device | | | | | |
| Device 4 | 51.9 | 27.3 | 148.4 | 13.8 | green |
| Cover Glasses | | | | | |
| GL-20 | 46.7 | 0.94 | 243.2 | 15.8 | neutral |
| GL-35 | 65.8 | 1.6 | 125.3 | 35.0 | neutral |
| Optibronze | 58.9 | 23.2 | 72.8 | 26.9 | warm |
| Bleached EC device with GL-20 | | | | | |
| Device 4 | 35.6 | 3.6 | 186.8 | 9.1 | neutral |
| Colored EC device with GL-20 | | | | | |
| Device 4 | 20.7 | 14.6 | 146.8 | 2.1 | neutral/green |
| Bleached EC device with GL-35 | | | | | |
| Device 4 | 51.5 | 5.2 | 162.9 | 20.3 | neutral |
| Colored EC device with GL-35 | | | | | |
| Device 4 | 32.3 | 19.8 | 145.1 | 4.7 | neutral/green |
| Bleached EC device with Optibronze | | | | | |
| Device 4 | 45.5 | 18.4 | 84.3 | 15.5 | warm |
| Colored EC device with Optibronze | | | | | |
| Device 4 | 25.6 | 20.9 | 114.7 | 3.5 | warm/neutral |

EXAMPLE 3

Preparation of a EC Device (Device 5a,b) Which Uses LiMnNiO Counterelectrode

A solution to deposit LiMnNiO electrode was prepared as follows. 1.56 g of lithium methoxide was dissolved in 50 ml of distilled ethanol. Separately 9.28 g of Nickel(ll) ethylhexanoate (78% in 2 ethylhexanoic acid) and 18.81 g of manganese(ll)2-ethylhexanoate (40% in mineral spirits) were mixed and stripped off in a rotary evaporator (@90° C.) of about 8.91 g of volatiles. After this 8.91 g of ethanol was added. The two solutions were then mixed together. After they dissolved in each other, a uniform phase was obtained which was used as a coating solution. The substrate (TEC15) was coated by spinning and then fired up to 450° C. under conditions similar to the vanadium oxide described above. The coating thickness was 180 to 200 nm depending on the spinning conditions. A cell (Device 5a) was prepared with tungsten oxide as the other electrode as described above in the case of vanadium oxide. The cell was filled with 1.5 M lithium perchlorate in PC and sealed. This cell did not require any pre-reduction because the lithium from the LiMnNiO electrode could be extracted as $Li^+$ ions upon applying a coloring voltage to the cell and inserting the extracted lithium reversibly into the tungsten oxide. This has many advantages in terms of processing of the EC devices. Particularly, if one needs to laminate the two substrates with a pre-formed electrolyte film, then one can easily handle these substrates in ambient conditions. A 3×3 inch sample was colored at 1.8 volts and bleached at −1.8 volts. The sample colored from 59% photopic to 8% photopic in 54 seconds and it bleached to the original value in 71 seconds. It was also found that the bleach rate was not affected when the bleach potential was lowered to −0.1V. Another sample (Device 5b) was made in the same size to measure color. The sample in the bleach state had 56.5% photopic transmittance. It was colored to 17.5% photopic transmittance and its color was measured again. The table below describes the details.

|  | L* | C* | h | Photopic (% T) | Color perception |
|---|---|---|---|---|---|
| Bleached EC device |
| Device 5b | 79.9 | 21.0 | 91.9 | 56.5 | warm |
| Colored EC device |
| Device 5b | 48.6 | 15.5 | 129.7 | 17.3 | neutral |
| Cover Glasses |
| GL-20 | 46.7 | 0.94 | 243.2 | 15.8 | Neutral |
| GL-35 | 65.8 | 1.6 | 125.3 | 35.0 | Neutral |
| Optibronze | 58.9 | 23.2 | 72.8 | 26.9 | Warm |
| Bleached EC device with GL-20 |
| Device 5b | 35.7 | 11.5 | 96.7 | 8.9 | neutral |
| Colored EC device with GL-20 |
| Device 5b | 19.5 | 8.8 | 129.4 | 2.9 | neutral |
| Bleached EC device with GL-35 |
| Device 5b | 51.7 | 16.2 | 95.2 | 19.9 | warm |
| Colored EC device with GL-35 |
| Device 5b | 28.9 | 11.5 | 130.3 | 5.8 | neutral |

-continued

|  | L* | C* | h | Photopic (% T) | Color perception |
|---|---|---|---|---|---|
| Bleached EC device with Optibronze |
| Device 5b | 46.4 | 31.2 | 76.9 | 15.6 | warm |
| Colored EC device with Optibronze |
| Device 5b | 24.9 | 18.8 | 93.6 | 4.4 | warm |

EXAMPLE 4

Ultrasonic Sealing of Plug Holes

This is a novel sealing method to close the plug holes (fill ports) which is described in detail in the already filed patent application DE 100 06 199.0. The welding requires a cover or a plug to be placed on top of the plughole or inside the plughole. This cover (or plug) is then bonded on to the glass by fusing its surface with the glass surface. An ultrasonic oscillator rapidly provides the energy required to do this. The equipment employs a press to place the cover with a certain force covering the hole and contacting the substrate, transducers, ultrasonic generator and controller. An equipment supplier for such a system is Telesonic Ultrasonics (Bridgeport, N.J.) who sells such ultrasonic welding systems. The oscillations are typically rotational or translational with respect to the surface normal. In case of the present EC device the holes are plugged by covering them with thin foils or plates. These foils could be made out of a single material or be alloys and composites. Some of the preferred materials are Al, Cu, Pt, Au, Ti and stainless steel. Preferred alloys are nickel containing alloys. For example Ni/Fe alloys and Ni/Fe/Co alloys such as Kovar which have thermal expansion similar to glass. The difference between the linear thermal expansion coefficient of glass and the metal cap should be less than $5\times10^{-6}$ cm/cm/C when measured between 25 to 300° C. Preferably, even if the thermal expansion of the two are close it is preferred that the alloy has a slightly lower shrinkage than glass so that on the glass surface close to the edge of the metal cap compressive forces are experienced. This will keep the joints less prone to stress failure.

Some of the Ni/Fe containing alloys are Invar, Alloy 52, Alloy 48, Alloy 42 and Alloy 42-6. These can be obtained from Ed Fagen Inc (Los Alamitos, Calif.). The table below gives the thermal expansion of these alloys between 30 and 300° C., for a comparison the expansion coefficient of soda-lime glass between 0 and 300° C. is $9.2\times10^{-6}$ cm/cm/° C. and the contraction coefficient from the annealing point to 25° C. is 114.

| Alloy | Kovar | Alloy 52 | Alloy 48 | Alloy 46 | Alloy 42 | Alloy 42-6 | Invar |
|---|---|---|---|---|---|---|---|
| Expansion Coeff (cm/cm/° C.) | $5.1 \times 10^{-6}$ | $10.2 \times 10^{-6}$ | $8.8 \times 10^{-6}$ | $7.5 \times 10^{-6}$ | $4.0$–$4.7 \times 10^{-6}$ | $8.2 \times 10^{-6}$ | $4.92 \times 10^{-6}$ |

A preferred thickness of the alloys used for plugging the holes is less than 300 micrometers. These could be coated with other metals, oxide layers or polymeric layers. When used with oxide and polymeric layers, the coated side preferably faces the plughole. This layer provides additional inertness, as this will likely be in contact with the electrolyte. Also during the fusion process the polymeric material in contact with the surface is burned away so that proper glass to metal bond is obtained. Another preferred composite material is surface anodized Al foil. One may also coat more inexpensive materials such as Al and Cu with gold and platinum to provide the inertness. One may also use adhesion promotion layers between these dissimilar materials to get good bonding between them. Most of the plugholes sealed were about 1.5 to 3 mm in diameter. The foil size was about 1 sq. cm in area with a typical thickness of 50 to 250 micrometers. The foil was pressed against the substrate with a force of 1000 to 10,000 N and then the ultrasonic energy was applied at 10–50 kHz. The welding time was between 0.1 to 1 second and no further post-processing was needed. This method has several advantages over the method described earlier where adhesives or adhesively bonded cover slides are used to plug the holes. Some of these advantages are:

Hermetic sealing, in particular gas-tightness (e.g. impermeable to He, $O_2$, $CO_2$, water vapor, etc.)

Short operating time and no post-processing is required (lower cost)

Wide material choice for the cover, including materials which are inert towards other cell components Long-term durability and low thermal stresses
No exposure or entrapment of environment of the cellcontents while sealing Thus this method and the advantages are applicable to the sealing of any chromogenic device.

EXAMPLE 5

Figure 12:
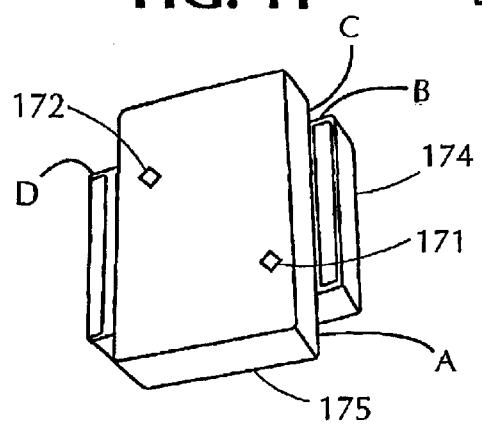
FIG. 12 illustrates an electrochromic device of this invention having both electrochromic and heating capabilities.

Device Showing Both EC Behavior and a Heating Phenomena Using the Same Transparent Conductor Which is Used to Power the EC Device A 11×11 inch (28 cm×28 cm) EC window device (Device 1) was made using Indium Tin Oxide (ITO, 15 ohms/square, Applied Films Corp, Longmont, Colo.) as one electrode and TCO12 (from AFG, Kingsport, Tenn.) as the other electrode. The tungsten oxide coating, a lithium tungstate $(Li_{0.5}W)O_x$, was deposited on the ITO glass. (This is not a reduced form of tungsten oxide as lithium is present as an oxide.) The thickness of the fired coating was 580 nm. The coating was fired in a humid atmosphere followed by a heat treatment up to 250° C. Details of deposition and precursor used can be found in comparative example 1 of PCT 97/05791, the disclosure of which is incorporated by reference herein. The coating was then etched from the perimeter area (about 10 mm in width) of the substrate. A cell was fabricated by dispensing an epoxy around the perimeter of one of the substrates and the conductive sides facing each other. This epoxy contained 300 micrometer (diameter) spherical glass beads. The spacers provided a separation of 300 micrometers between the two substrates, which would be the thickness of the electrolyte. The preferred thickness of the electrolyte is between 37 micrometers to about 5 mm. The epoxy was dispensed on the etched area. The second TEC15 175 substrate was lowered onto the first substrate 174 while providing an offset of about 5 mm along two edges of each substrate as shown in FIG. 12. The epoxy was cured at elevated temperatures (typically in the range of 80 to 200° C.). Typical curing time is between 10 minutes to a few hours. The upper substrate 175 had two 1.6 mm diameter holes along its diagonal about 10 mm away from the corners. The electrolyte was injected through one of these holes to fill the cavity with the electrolyte. The electrolyte contained (all weight %) 0.35% ferrocene, 10.5% $LiCF_3SO_3$, 48.9% PC, 32.6% sulfolane and 7.65% of polymethylmethacrylate with a molecular weight of about 540,000. The holes were then sealed with Teflon plugs followed by rectangular glass cover slides 171 and 172, which were bonded by a UV curable adhesive (shown in FIG. 12). The sealing is done by first priming the hole area and a 1 mm thick (about 1 cm square) glass cover-plate with a primer based on Dow Corning (MI) Z6030 silane. The cover-plates are then glued using a UV curable adhesive to block the holes. Another thermal curing epoxy is then used to seal the sides of the cover-plates to further enhance the environmental barrier. Alternatively, the plug area may be sealed with metallic caps, as described in Example 4.

On each substrate edge which was protruding out, a conductive busbar was soldered, and then connected to wires A,B, C and D as shown in FIG. 12. Wires A and C were pigtailed together, and B and D were pigtailed together. When A+C were connected to a Positive terminal of a DC power supply of 1.2V, and B and D were connected to the negative terminal, the device colored and when the polarity was reversed (and the potential decreased to −0.6V), the device bleached to the original value. Then, all the wires were disconnected from each other and from the power supply. When wires A and C were respectively connected to a positive and a negative terminal of a DC power supply of 12V, a current flowed through the circuit and the surface temperature of the glass increased.

EXAMPLE 6

Figure 13:
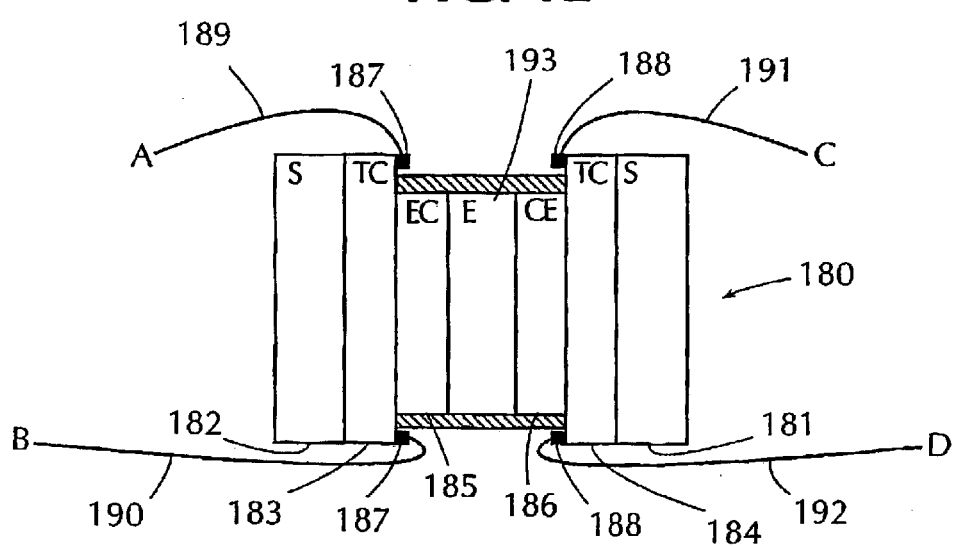
FIG. 13 illustrates an electrochromic device of this invention having a shad band area that is controlled by the resistance between the electrodes.

Fabrication of an Electrochromic Device (Device 4) With Tungsten Oxide Electrochromic Layer and With Vanadium Oxide Intercalating Counterelectrode. This Device Shows a Shade Band Concept by Controlling the Resistance Between the Electrodes A 11×11 inch (28 cm×28 cm) EC window device 180 was made using TEC 15 and TEC 8 (from Pilkington LOF, Toledo, Ohio) as shown in FIG. 13. The glass substrates 181 and 182 are designated S and the conductive coatings 183 and 184 as TC. TEC 15 was used to coat tungsten oxide 185 and TEC8 for the counterelectrode 186. Each of the transparent substrates have a pair of busbar 187 and 188 running parallel to the two opposite edges as shown. These busbars 187 and 188 are connected to the electrical wires 189–192. The electrochromic coating EC 185 is tungsten oxide and the counterelectrode CE 186 is vanadium oxide. These coated substrates are separated by an electrolyte E 193. The tungsten oxide coating, lithium tungstate $(Li_{0.5}W)O_x$, was deposited, as described earlier in example 5, on one of the TEC 15 glass. The thickness of the fired coating was 580 nm. Another piece of similar sized TEC 15 was coated with a vanadium oxide coating (counterelectrode). Both the electrodes in the cell store or intercalate ions. Both electrodes possess electrochromic properties, but the doped tungsten oxide imparts stronger coloration. This substrate had two small holes (about 1/16 of an inch (1.6 mm)) about 1.5 cm from two of its diagonal corners. The substrate are used to assemble an empty cavity as described in the earlier example. These holes are not shown in FIG. 13.

The cell (or cavity) is first flushed by high purity nitrogen (chromatography grade). A potential of −0.5V is applied to the two electrodes before the reducing electrolyte is introduced in the cavity. This positive electrode is tungsten oxide. The reducing liquid electrolyte is 0.05M ferrocene and 1.0 molar lithium triflate in a mixture of 50% sulfolane and 50% acetonitrile by weight. All the liquids used to process the cell should have low water content, preferably below 1000 parts per million, and more preferably below 100 parts per million. This reducing electrolyte introduced through one of the two holes (fill port) in one of the substrates while the above potential is applied. After filling, the polarity of the potential is reversed and it is increased to 1.3V. This potential is applied for two minutes till the cell colors uniformly. The cell is bleached by reversing this potential (1.3V with CE being negative), and after the cell bleaches, while the potential is still being applied, the cell is drained of the reducing electrolyte. Alternatively, the electrolyte could also be drained in the colored state. The cell is now filled with cleaning solvent to get rid of the residues from the prior process, which is typically acetonitrile and sulfolane in equal amounts by weight. The cleaning solvent is drained and then preferably the cell is filled by another cleaning solvent which can be acetonitrile only. The cell is dried by pumping the high purity nitrogen. The final electrolyte is introduced that may have monomers which could be polymerized in-situ by heat, UV, visble, IR or microwave radiation. As described in the above example, the fill holes are sealed after the filling process.

The electrolyte, consisted of a dissociable salt in a medium. Preferred salts include lithium triflate, lithium methide and lithium trifuoromethanesulfonimide (trade name HQ115 available from 3M specialty Chemicals, St. Paul, Minn.). Preferred solvents are polar solvents such as sulfolane, methyl sulfolane glyme, PC, gamma-butyrolactone, etc. In this example 1.5M salt in sulfolane was used. A UV stabilizer was also added to the electrolyte. The components were dried so that the electrolyte had a water content of less than 30 ppm. Typical salt concentration is chosen from 0.1M to 3M.

A coloring voltage is applied between A and C of 1.2V (with the tungsten oxide side being negative), and all the other terminal wires from the cell are in open and not connected to the power circuit. The cell starts coloring from the busbar which is powered, and the coloration proceeds in a parralel line to the powered busbar till the whole cell is colored.

The foregoing description for the purposes of simplicity has concentrated on chromogenic devices having electrochromic layers. However it will be apparent to those skilled in the art that chromogenic devices employing no electrochromic layers but instead employing an electrolyte having at least one anodic and one cathodic compound together with salts and UV stabilizers, etc, or which use particles suspended in the electrolyte (suspended particle devices) which change orientation under the applied electric field rather than electrochromic layers can be made. Further and other modifications may be made by those skilled in the art without, however, departing from the spirit and scope of the invention.

What is claimed is:

1. A transparent chromogenic assembly, comprising:
   a. a pair of facing transparent substrates defining a cavity for enclosing an electrolyte medium; facing surfaces of the substrates each having a conductive transparent coating, said conductive coating of at least one of said substrates being interrupted along a demarcation line having a thickness of at least 0.01 mm to insulate contiguous areas on opposite sides of said line from one another, the conductive coating of at least one of the substrates being overlain with an electrochromic layer; and
   b. a set of busbars deposed toward the periphery of each of said areas.

2. A transparent chromogenic assembly according to claim 1 further including an adhesive spacer element interposed between said substrates.

3. A transparent chromogenic assembly according to claim 2 wherein said spacer element is adapted to insulate a portion of said busbars from exposure to said electrolyte.

4. A transparent chromogenic assembly according to claim 2 wherein said electrochromic layer comprises at least one transition metal oxide.

5. A transparent chromogenic assembly according to claim 4 wherein said one transition metal oxide comprises tungsten oxide.

6. A transparent chromogenic assembly according to claim 1 wherein each set of said busbars is individually energizeable to effect a color change through a respective one of said areas.

7. A transparent chromogenic assembly according to claim 1 wherein said electrolyte exhibits chromogenic properties.

8. A transparent chromogenic assembly according to claim 1 wherein a portion of said busbars is provided with a passivation coating to insulate said portion from said electrolyte.

9. A transparent chromogenic assembly according to claim 1 wherein a portion of each set of busbars extends from the facing surface of a respective substrate over an edge thereof to form an electrical connector.

10. A transparent chromogenic assembly according to claim 1 wherein each set of said busbars adjoins at least two sides of a respective one of said areas.

11. A transparent chromogenic assembly according to claim 1 wherein said transparent conductive coating comprises a material selected from the group consisting of a doped oxide of tin and indium-tin oxide.

12. A transparent chromogenic assembly according to claim 1 wherein at least one of said substrates is either tempered, strengthened or tempered and strengthened.

13. A transparent chromogenic assembly according to claim 1 having a counterelectrode layer on a surface of said substrates facing the surface containing said electrochromic layer.

14. A transparent chromogenic assembly according to claim 13 wherein said counterelectrode mixture contains an oxide selected from the group consisting of lithium oxide, nickel oxide, vanadium oxide and manganese oxide.

15. A transparent chromogenic assembly according to claim 1 wherein said electrolyte medium has at least one dissociable salt and one UV stabilizer.

16. A transparent chromogenic assembly according to claim 1 wherein said electrolyte medium includes a solvent or plasticizer containing a sulfolane.

17. A transparent chromogenic assembly according to claim 16 wherein said electrolyte medium is converted to a solid material by incorporation of a material selected from the group consisting of polymers, in-situ polymerizable monomers and nano-partical inorganic oxides.

18. A transparent chromogenic assembly according to claim 16 wherein said electrolyte is thickened by incorporation of a material selected from the group consisting of polymers and nano-particle inorganic oxides.

19. A transparent chromogenic panel for use on the exterior of a transportation vehicle exposed to the weather requiring an average current less than 10 $\mu A/cm^2$ of active area to maintain any desired state of transmission at a temperature of up to 85° C. for a duration of at least 8 hours.

20. A transparent electrochromic panel according to claim 19 having inorganic electrochromic and counterelectrodes defining said active area, said electrodes being selected principally from the transition metal oxides, such as tungsten oxide and vanadium oxide, respectively, and having a liquid or solid polymer matrix electrolyte containing a sufficient amount of a sulfolane to act as a solvent and/or plasticizer for said electrolyte and a water content lower than 2000 ppm, preferably as low as 10 ppm.

21. A transparent chromogenic panel according to claim 19 which imparts to the perceiver a warm or neutral perceived color comprising: an active component layer and a passive component layer in which the active component layer is selected from the group consisting of electrochromic, liquid crystal, user-controllable-photochromic, polymer-dispersed-liquid crystal or suspended particle devices and the passive component layer is selected from the group consisting of substrates or covers for the active layer, said active and said passive layers being chosen so that the color and the transmissivity of the passive layer accommodates the range of color change in the active layer to maintain the transmitted color of the panel in a warm or neutral shade, where warm colors on the L*C*h color sphere scale correspond to C having a value between 15 and 45; h having a value between 100 and 20, and where the value of L depends on the darkness of the glass or preferred degree of photopic transmission desired.

22. A transparent electrochromic panel as in claim 21 wherein the neutral colors correspond to C less than 15, preferably less than 5, and h between 0 and 360, while L can be any number yielding the desired photopic transmission.

23. A transparent electrochromic panel according to claim 21 wherein said active component layer comprises:
   a. a pair of facing glass substrates separated by a spacer to define a cavity for an electrolyte medium, facing surfaces of said substrates each having a conductive transparent coating, said conductive coating being interrupted on at least one of said substrates to define individual areas, the conductive coating of at least one of the substrates being overlain with an electrochromic layer;
   b. a set of individually energizable busbars deposed toward the periphery of each of said areas to effect a respective color change therethrough.

24. A method of making an electrochromic panel having a pair of facing glass substrates forming a cell cavity for an electrolyte; facing surfaces of the substrates each having a conductive transparent coating where each of these faces is coated with ion-intercalatable electrodes, at least one of which is electrochromic, wherein one of said electrodes is reduced after the cell cavity is formed, comprising the steps of:
   (a) filling said cavity with a reducing fluid medium containing at least one of an anodic and a cathodic redox material;
   (b) applying a voltage at least once to reduce one of said electrodes;
   (c) flushing the reducing liquid from the cavity, and
   (d) filling said cavity with the electrolyte, wherein said reducing fluid medium includes at least one of a dissociable salt and an acid.

25. The method of claim 24 wherein said redox material is a metallocene.

26. The method of claim 25 wherein said metallocene is selected from the group consisting of ferrocene, a ferrocene derivative, cobaltocene and a mixture thereof.

27. The method of claim 24 wherein said dissociable salt is selected from the group consisting of lithium, sodium and potassium.

28. The method of claim 24 wherein said one of said substrates is provided with an electrochromic layer the composition of which includes at least an oxide of tungsten.

29. The method of claim 24 wherein at least one of said ion-intercalatable electrodes contains at least one oxide selected from the group consisting of vanadium oxide, nickel oxide and manganese oxide.

30. The method of claim 24 wherein the electrolyte contains each of the following: at least one dissociable salt; at least one UV stabilizer; at least one polar solvent; and a water content less then 2000 ppm.

31. The method of claim 30 wherein the polar solvent is selected from the group consisting of sulfolane, methyl sulfolane, propylene carbonate, gamma-butyrolactone and polyethylene glycol.

32. The method of claim 24 wherein said electrolyte is converted to a solid material by incorporation of a material selected from the group consisting of polymers, in-situ polymerizable monomers and nano-partical inorganic oxides.

33. The method of claim 24 wherein said electrolyte is thickened by incorporation of a material selected from the group consisting of polymers and nano-partical inorganic oxides.

34. The method of claim 24, wherein said reducing fluid is forced out of said cell cavity by a flushing medium consisting of at least one of a polar solvent, non-polar solvent or an inert gas.

35. The method of claim 24, wherein said step of flushing is repeated one or more times prior to filling said cavity with said electrolyte.

36. A transparent chromogenic device with controlled variation of an area of coloration, said device comprising:
   (a) a pair of facing transparent substrates defining a cavity enclosing an electrolyte medium;
   (b) facing surfaces of the substrates each having a conductive transparent coating;
   (c) each conductive transparent coating having at least two bus bars in contact therewith, wherein each of said two bus bars contacting each conductive transparent coating are positioned in a spaced-apart relationship defining a portion of said device in which the area of coloration of said device is variably controlled; and
   (d) a controller that provides a means for controlling the area of coloration by varying a voltage drop across said device, wherein said means for controlling the area of coloration includes a switch for applying a voltage between a first one of said two bus bars contacting a first one of the conductive transparent coatings and an opposing first one of said two bus bars contacting a second one of the conductive transparent coatings.

37. The transparent chromogenic device according to claim 36, further comprising an electrochromic layer disposed on at least one of the conductive transparent coatings.

38. The transparent chromogenic device according to claim 36, wherein said electrolyte medium is electrochromic.

39. The transparent chromogenic device according to claim 36, wherein said means for controlling the area of coloration includes a resistor communicating between a second one of said two bus bars contacting the first one of the conductive transparent coatings and an opposing second one of said two bus bars contacting the second one of the conductive transparent coatings.

40. The transparent chromogenic device according to claim 39, wherein said resistor is a variable resistor.

41. A transparent chromogenic device having both coloration and heating capability, said device comprising:
   (a) a pair of facing transparent conductors defining a cavity enclosing an electrolyte medium;
   (b) a transparent substrate on an outer face of at least one of said transparent conductors;
   (c) at least one transparent conductor having at least two bus bars in contact therewith, wherein said two bus bars contacting said transparent conductor are positioned in a spaced-apart relationship defining a portion of said device which may be colored or heated; and
   (d) a controller that provides a means to selectively apply a voltage to color said device or heat said device, wherein said controller includes an electrical circuit that is selectively controlled to (i) cause coloration of said device by creating a voltage potential between at least one of said two bus bars contacting a first one of the transparent conductors and at least one bus bar contacting a second one of the transparent conductors and (ii) cause heating of said device by creating a voltage potential between at least said two bus bars contacting at least one of said transparent conductors.

42. The transparent chromogenic device according to claim 41, wherein said device is comprised of two transparent substrates each on an outer face of each conductor.

43. The transparent chromogenic device according to claim 41, further comprising an electrochromic layer disposed on at least one of the transparent conductors.

44. The transparent chromogenic device according to claim 41, wherein said electrolyte medium is chromogenic.

45. A solar powered chromogenic window system comprising:
(a) a chromogenic glazing;
(b) a solar power source for providing power to said chromogenic glazing; and
(c) either a central control system or user controlled interface that is in wireless communication with said solar power source.

46. A front-side window of a vehicle having at least a chromogenic portion comprising:
(a) a pair of facing transparent conductors with an electrolyte medium disposed therebetween in an area of said window defined by a look-through portion of said window for a driver of said vehicle looking at a side-view mirror of said vehicle;
(b) a transparent substrate on an outer face of at least one of said transparent conductors; and
(c) a set of busbars disposed toward at least a portion of the periphery of said area of each conductor.

47. The front-side window according to claim 46, wherein said window is comprised of two transparent substrates each on an outer face of each conductor.

48. The front-side window according to claim 46, further comprising an electrochromic layer disposed on at least one of the transparent conductors.

49. The front-side window according to claim 46, wherein said electrolyte medium is electrochromic.

50. A chromogenic glazing having improved wireless signal transmission capability, said glazing comprising:
(a) a pair of facing transparent conductors defining a cavity enclosing an electrolyte medium; and
(b) a transparent substrate on an outer face of at least one of said transparent conductors,
wherein said improvement resides in the absence of the transparent conductors in a defined area or the inclusion of at least one optical transceiver in said device.

51. The chromogenic glazing according to claim 50, wherein said glazing is comprised of two transparent substrates each on an outer face of each conductor.

52. The chromogenic glazing according to claim 50, further comprising an electrochromic layer disposed on at least one of the transparent conductors.

53. The chromogenic glazing according to claim 50, wherein said electrolyte medium is chromogenic.

54. A method of controlling the uniformity of appearance of a glazing comprised of a plurality of chromogenic panels, said method comprising the steps of:
(a) receiving image data from at least one optical sensor individually scanning said chromogenic panels;
(b) using said image data to adjust the power supplied to each individual chromogenic panel to a predetermined light transmission value.

55. The method according to claim 54, wherein said predetermined light transmission value for each chromogenic panel is substantially equivalent.

56. The method according to claim 54, wherein said predetermined light transmission value for each chromogenic panel is set to create a desired image in said glazing.

57. A chromogenic glazing system comprising:
(a) at least one chromogenic glazing communicating with a control system;
(b) a photosensor that communicates with said control system; and
(c) a temperature sensor that communicates with said control system, wherein data received by said control system from said photosensor and temperature sensor is processed to select a predetermined amount of power to be supplied to said chromogenic glazing.

58. The chromogenic glazing according to claim 57, wherein said temperature sensor determines a temperature of an interior compartment of a vehicle or building.

59. The chromogenic glazing according to claim 57, wherein said temperature sensor determines a temperature of ambient conditions outside a vehicle or building.

60. A chromogenic window comprising:
(a) a non-polarizing chromogenic layer disposed between two transparent conductors;
(b) a transparent substrate on an outer face of at least one of said transparent conductors; and
(c) at least one coating or layer selected from the group consisting of:
(i) at least one polarizing filter,
(ii) a self-cleaning coating; and
(iii) a hydrophilic coating.

61. The chromogenic window according to claim 60, wherein said window is comprised of two transparent substrates each on an outer face of each conductor.

62. The chromogenic window according to claim 60, wherein at least one of said coating or layer is laminated to said chromogenic window.

63. The chromogenic window according to claim 60, wherein said window further comprises at least one of an IR or UV blocking layer.

64. A chromogenic device comprising:
(a) a pair of facing conductors defining a cavity enclosing an electrolyte medium wherein at least one of said conductors is transparent; and
(b) a transparent substrate on an outer face of at least one of said transparent conductors, wherein said substrate is a glass substrate comprised of phosphate or is laminated with a phosphate containing material.

65. The chromogenic device according to claim 64, wherein both conductors are transparent and said device is comprised of two transparent substrates each on an outer face of each conductor.

66. The chromogenic device according to claim 64, further comprising an electrochromic layer disposed on an inner face of at least one of said transparent conductors.

67. A chromogenic device comprising:
(a) a pair of facing conductors defining a cavity enclosing an electrolyte medium, wherein at least one of said conductors is transparent; and
(b) a transparent substrate on an outer face of at least one of said transparent conductors, wherein said substrate is a glass substrate comprised of a rare earth oxide selected from the group consisting of neodymium oxide, erbium oxide, ytterbium oxide or mixtures thereof.

68. The chromogenic device according to claim 67, wherein both conductors are transparent and said device is comprised of two transparent substrates each on an outer face of each conductor.

69. The chromogenic device according to claim 67, further comprising an electrochromic layer disposed on an inner face of at least one of said transparent conductors.

70. A method of sealing fill holes in a chromogenic assembly having a glass substrate comprising the step of covering each of said holes with a metal cap, wherein the difference between the linear thermal expansion coefficient of the glass substrate and the metal cap is less than $5\times10^{-6}$ cm/cm/° C when measured between 25 and 300° C.

71. A chromogenic assembly comprising:
   (a) a pair of facing conductors defining a cavity enclosing an electrolyte medium wherein at least one of said conductors is transparent; and
   (b) a transparent substrate on an outer face of at least one of said transparent conductors, wherein said transparent substrate is a strengthened substrate or a strengthened transparent substrate is laminated to said transparent substrate.

72. The chromogenic assembly according to claim 71, wherein both conductors are transparent and said device is comprised of two transparent substrates each on an outer face of each conductor.

73. The chromogenic assembly according to claim 72, wherein both transparent substrates are strengthened transparent substrates.

74. A chromogenic window comprising:
   (a) chromogenic layer disposed between two transparent conductors;
   (b) a transparent substrate on an outer face of at least one of said transparent conductors; and
   (c) at least one laminated layer on an outer surface of said window selected from the group consisting of:
      (i) a glass breakage sensing layer;
      (ii) an antenna layer;
      (iii) a heater layer; or
      (iv) a bullet proof layer.

* * * * *

UNITED STATES PATENT AND TRADEMARK OFFICE
CERTIFICATE OF CORRECTION

PATENT NO. : 6,795,226 B2
DATED : September 21, 2004
INVENTOR(S) : Anoop Agrawal et al.

It is certified that error appears in the above-identified patent and that said Letters Patent is hereby corrected as shown below:

Column 2,
Line 11, "maybe" should read -- may be --.

Column 4,
Line 31, "section-through" should read -- section through --.

Column 5,
Line 29, "arises" should read -- arise --;
Line 45, "See," should read -- See --; and
Line 57, "to perceived" should read -- to be perceived --.

Column 6,
Line 12, "C=✓V($a^2+b^2$)" should read -- C=✓($a^2+b^2$) --; and
Line 16, "of to 35%" should read -- of 15 to 35% --.

Column 8,
Line 26, "example, The" should read -- example, the --; and
Line 64, "(Toledo Ohio)" should read -- Toledo, Ohio) --.

Column 9,
Line 55, "can" should read -- can be --.

Column 13,
Line 37, "organic-inorgainc" should read -- inorganic-inorganic --; and
Line 47, "the" (first occurrence) should be deleted.

Column 14,
Line 32, "Sun" should read -- sun --.

Column 16,
Line 4, "123;" should read -- 123, --.

Column 22,
Line 30, "have be" should read -- have been --.

Column 26,
Line 31, "hot-or" should read -- hot or --; and
Line 50, "Solar" should read -- solar --.

UNITED STATES PATENT AND TRADEMARK OFFICE
CERTIFICATE OF CORRECTION

PATENT NO. : 6,795,226 B2
DATED : September 21, 2004
INVENTOR(S) : Anoop Agrawal et al.

It is certified that error appears in the above-identified patent and that said Letters Patent is hereby corrected as shown below:

Column 27,
Line 7, "Solar" should read -- solar --.

Column 28,
Line 12, "at" should read -- that --.

Column 29,
Line 24, "Ox" should read -- Ox. --.

Column 30,
Line 13, "Neurontin ®tral" should read -- Neutral --;
Line 44, "posses" should read -- possess --; and
Line 57, "were" should read -- was --.

Column 32,
Line 32, "electrode" should read -- electrodes --.

Column 37,
Line 2, "cellcon-" should read -- cell con- --.

Column 38,
Line 18, "busbar" should read -- busbars --; and
Line 33, "substrate" should read -- substrates --.

Column 39,
Line 14, "parralel" should read -- parallel --.

Column 40,
Line 65, "20, and" should read -- 20; and --.

Column 41,
Line 14, "layer;" should read -- layer; and --; and
Line 31, "liquid" should read -- fluid -- and "cavity, and" should read -- cavity; and --.

Column 42,
Lines 14, 15, 23, 25, 36, 38, 49 (both occurrences), 59 and 63, "bus bars" should read -- busbars --;
Line 16, "are" should read -- is --; and
Line 60, "bus bar" should read -- busbar --.

UNITED STATES PATENT AND TRADEMARK OFFICE
CERTIFICATE OF CORRECTION

PATENT NO. : 6,795,226 B2
DATED : September 21, 2004
INVENTOR(S) : Anoop Agrawal et al.

It is certified that error appears in the above-identified patent and that said Letters Patent is hereby corrected as shown below:

<u>Column 44,</u>
Line 21, "filter," should read -- filter; --.

Signed and Sealed this

Twenty-eighth Day of February, 2006

JON W. DUDAS
*Director of the United States Patent and Trademark Office*